(12) United States Patent
Wignot et al.

(10) Patent No.: US 8,842,022 B2
(45) Date of Patent: Sep. 23, 2014

(54) SYSTEM AND METHOD FOR CONFIGURING A TRAFFIC CONTROL SENSOR SYSTEM

(75) Inventors: Leroy Samuel Wignot, Carmel, IN (US); Wei Wang, Carmel, IN (US)

(73) Assignee: MS Sedco, Inc., Indianapolis, IN (US)

(*) Notice: Subject to any disclaimer, the term of this patent is extended or adjusted under 35 U.S.C. 154(b) by 192 days.

(21) Appl. No.: 13/468,763

(22) Filed: May 10, 2012

(65) Prior Publication Data

US 2013/0300583 A1 Nov. 14, 2013

(51) Int. Cl.
*G08B 21/00* (2006.01)

(52) U.S. Cl.
USPC ............................. 340/917; 340/923; 701/117

(58) Field of Classification Search
CPC .................................. G08G 1/08; G01S 13/91
USPC ................. 340/907, 916, 917, 918, 923, 933; 701/117
See application file for complete search history.

(56) References Cited

U.S. PATENT DOCUMENTS 8,253,592 B1 * 8/2012 Chandra et al. ............... 340/917

* cited by examiner

*Primary Examiner* — Jeffery Hofsass
(74) *Attorney, Agent, or Firm* — Bruce J. Bowman

(57) ABSTRACT

A traffic control sensor system which provides outputted signals to a receiving traffic control system to assist the traffic control system in making real-time informed green light decisions. Such signals received by the traffic control system include calls for a green light for monitored traffic lanes approaching an intersection. The traffic control sensor system employs various techniques to reduce the number of vehicles that are dropped or occluded. A vehicle is considered to be dropped or occluded whenever the traffic control sensor system first detects the vehicle entering a user defined zone within the approaching lanes to the intersection, and then fails to detect or monitor such vehicle exiting the user defined zones. Occlusion or dropping may occur whenever a sensor is malfunctioning, certain environmental conditions are present, or during any time the sensor's detection signal is interrupted such as from cross traffic entering the monitored intersection.

6 Claims, 13 Drawing Sheets

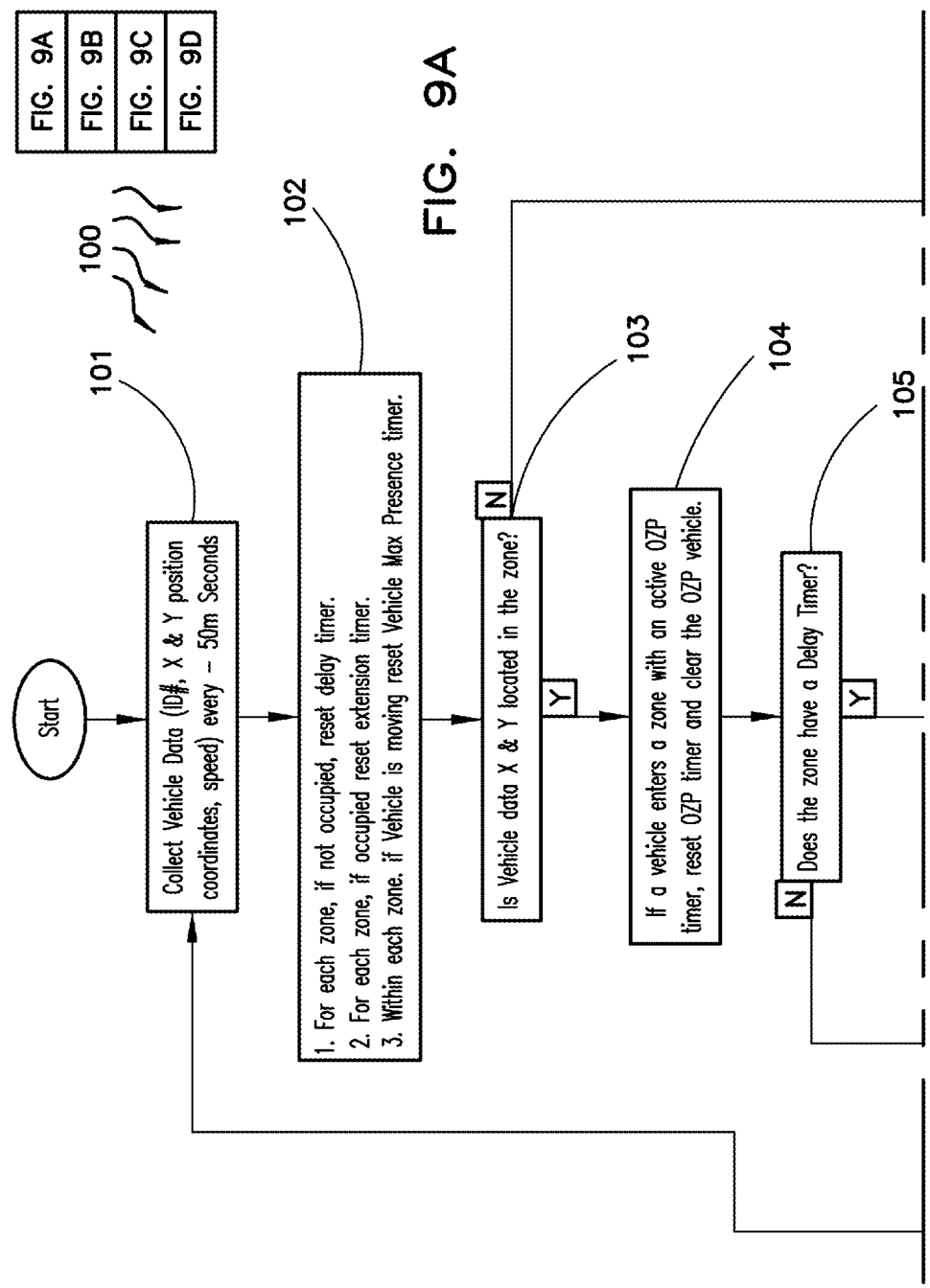

SYSTEM AND METHOD FOR CONFIGURING A TRAFFIC CONTROL SENSOR SYSTEM

RELATED APPLICATIONS

Not Applicable.

FIELD OF THE INVENTION

The present invention relates is directed to traffic control indicators for detecting and controlling vehicle traffic at or about a roadway intersection. More particularly the present invention uses one or more radar transceivers and a detection system in combination with traffic control devices to facilitate an orderly and effective flow of vehicle traffic though said intersection. The term vehicle as used herein shall include any vessel which is utilized for travel or which exhibits movement. For purposes of the present invention, a pedestrian on foot, skateboard, bicyclist, or other mobile vessel is also considered a vehicle. A traffic control device as used herein is defined as any device which emits or causes the emission of any light, sound and/or movement to indicate a traffic condition.

BACKGROUND OF THE INVENTION

The use of traffic control devices to provide a means for a safe and orderly flow of vehicle traffic have been known for over 200 years. The first known traffic control device for regulating street traffic was installed in 1868 in London, England at the intersection of George and Bridge Streets near the Houses of Parliament. This first traffic control device was designed by railroad signal engineer JP Knight. His device had two semaphore arms which, when extended horizontally, meant "stop"; and when drooped at a 45-degree angle, meant "caution." At night, red and green gas lights accompanied the "stop" and "caution" positions. Since this early example of a traffic "stop light", there have been numerous inventions directed towards various apparatus and systems for controlling traffic.

During the time since JP Knight's first invention, vehicle travel upon the roadways has increased dramatically thereby necessitating the need for more "intelligent" traffic control devices.

To this end, electronic traffic control systems were eventually developed and employed to regulate traffic at intersections. Some of the earliest examples of such systems were comprised of a single unitary stop light structure that was hung directly in the center of an intersection with appropriate colored lights projected to each direction where traffic was to be controlled. This single stop light was hard wired to communicate with a separate control box positioned in a safe area away from traffic, such as on the ground adjacent to the intersection. This type of control box controlled traffic flow by utilizing a hard wired circuit comprised of multiple analog timers and a compliment of solenoids. Systems such as this merely executed an established algorithm and did not vary "stop" and "go" patterns. In other words, once this traffic control system was configured, it did not have the ability to discern if an outside condition was present that would require altering its pre-configured traffic control patterns.

As technology progressed and traffic control systems became more sophisticated, the older control boxes were replaced with modern digital processors. These digital processors gave traffic control systems the ability to sense and process the detection of approaching vehicles in order to provide the traffic control system with some flexibility to alter preconfigured traffic pattern algorithms based upon data inputted from external sensors. Such early input sensors were limited to inductive loops embedded within the roadway surface. Inductive loop sensors have always been expensive to install and maintain, and in fact provided only a limited amount of useful data to the traffic control system. Furthermore, inductive loop sensors are often unreliable and require a great deal of calibration once embedded within a roadway surface. After installation the configuration time for these sensors is significant since the inductive loops must be manually tuned and physically wired into the traffic controller in the proper configuration. Thus, detection zones established by inductive loop sensors must be predetermined by physically embedding said loop sensors within the roadway surface at predetermined locations. The inductive loop sensor must be physically wired to the traffic controller in order to provide input to said traffic controller. High installation costs are attributed at least in part due to the need to install loop sensors for each and every approach to an intersection where vehicle traffic monitoring is desired. Typically, embedded inductive loops are limited to providing the traffic control system with simple data such as whether or not a vehicle is present upon the roadway somewhere within the monitored area where an inductive loop has been installed. Of course the monitored zones defined by inductive loop sensors cannot be easily changed as the roadway itself must be altered with sizable grooves to accept the inductive loop sensors. Such loop sensors are still in use today upon roadways around the world.

As roadway traffic continued to increase new traffic control systems were needed which possessed the ability to adapt to real-time traffic conditions and patterns based upon changing events upon the roadway, various times of day, or days of the week.

To this end, modern sophisticated traffic control systems were developed which implement one or more video cameras or microwave transceivers configured to provide input data to the traffic control system. This inputted data from external sensors assists the traffic control system in properly actuating traffic control devices in response to the detection or lack of detection of vehicles within various user defined portions (zones) of the roadway. For example, external sensors can enable a traffic control system to skip unnecessary signal phases such as a left turn lane when no vehicles are detected in that particular zone. External traffic sensors can also enable a traffic signal to increase green light duration for major arterials by presenting a green light in the lesser traveled cross streets (and thus a red light for a major arterial) only when vehicles are detected upon the lesser travel cross street. Thus, external traffic sensors assist in properly actuating a signalized intersection to improve traffic flow.

External traffic sensors can be utilized to assist in controlling traffic at any intersection or convergent point where vehicle movement is detected upon a surface. Examples of vehicles for purposes of this specification include but are not limited to, automobiles, trucks, motorcycles, water going vessels, pedestrians on foot, pedestrians operating mobile apparatus, aircraft and trains. In this specification and in the following claims, the term intersection means any point of convergence by two or more thoroughfares carrying vehicles.

Video detectors have been deployed as external sensors at intersections to alert the traffic control system when vehicles are approaching the intersection. To this end, a video camera is placed high above the intersection on a dedicated mounting arm such that the video camera's view covers one approach to the intersection. The video signal from the camera is digitally processed to create detection indicators when a vehicle is located within a user configured zone. Since a dedicated mounting arm is often necessary and one camera per approach is required, the installation cost of a video detector system can be expensive and time consuming. Furthermore, a time consuming process is usually required to configure video sensors for operation. Since video detectors rely upon visually detecting movement upon the roadway, they are affected by any environmental event which limits visibility such as darkness, rain, snow, fog, or when the sun is positioned in a manner which causes a glare upon the roadway or images to be detected by the video detector. For this reason, data produced by video detectors is often inconsistent or unreliable.

Microwave sensors have also been employed as external sensors to gather traffic related data for traffic control systems. Unlike video sensors, microwave sensors are not affected by weather events. Microwave sensors typically do not require a dedicated mounting arm since they are usually mounted much lower in relation to the ground than a video detector. Most microwave sensors also have the capability to monitor a wider geographic area than a video detector.

Although microwave and video sensors are able to provide much more useful information that inductive loops, neither sensor is one hundred percent reliable when detecting and maintaining the position of a vehicle from the time it enters a monitored detection zone until such time it exits the monitored detection zone. Failing to track a vehicle from the time it enters a monitored detection zone until such time as it exits the monitored detection zone is called occlusion. Although microwave and video sensors do overcome some of the disadvantages presented by inductive loop sensors, both are prone to occluding vehicles from detection when certain conditions are present.

Speaking to microwave sensors in particular, occlusion may occur anytime the view of the approaching vehicle is obstructed (even momentarily) from the sensor. Such obstructions can occur as a result from roadway conditions or when other traffic obscures or hides a previously detected vehicle from the outputted signal of the microwave sensor.

When an occlusion occurs, a vehicle may nevertheless be present upon the monitored portion to the intersection even though it is no longer being detected by the sensor. When this occurs the vehicle would be forced to wait longer for a green light until such later time as the microwave sensor regains detection of the vehicle, or until the next timed traffic cycle provides a green light. It would therefore be useful if a traffic control system was configured to minimize the number of occlusions.

Accordingly, the present invention overcomes the aforementioned shortcomings of the known prior art and provides improvements to the above stated shortcomings. The present invention is summarized and described in detail below.

SUMMARY OF THE INVENTION

The present invention is a microwave radar based traffic control system and method that makes intelligent decisions whether or not a vehicle is stranded (occluded) within a user defined zone adjacent to an intersection. A user defined zone is defined as a four-sided geographic area of the roadway which will be monitored by the traffic control system.

The present invention could also be easily implemented by utilizing other sensors such as video cameras or any other devices which detect a signal that a vehicle is present within a user defined zone. Being stranded means that a vehicle is forced to stop and wait at a red traffic light even though the traffic control system would have otherwise eventually provided a green light if it were aware of the vehicle's presence at the intersection. Vehicles periodically become stranded at an intersection because they are occluded. Occlusion occurs whenever the microwave transceiver sensor detects a moving vehicle entering a user defined zone, but does not detect said vehicle exiting the user defined zone. In other words, failing to maintain tracking of a vehicle during its travel through the entire user defined zone is called occlusion. To this end, the present invention makes a determination whether or not an occluded vehicle has in fact been stranded at the monitored intersection. When the present invention determines that an occluded vehicle has been stranded at the intersection, it requests a green light from the traffic control system for the affected user defined zone(s) even though the sensor is no longer detecting said occluded vehicle. When current sensors known in the prior art do not employ the present invention, the occluded vehicles are simply ignored by the sensor and will either exit the intersection before a red light is displayed, or will be stranded at the intersection because a red light has been displayed due to the occluded vehicle no longer being detected by the sensor.

The following is a more detailed explanation of how modern traffic control systems operate and how occluded vehicles become stranded at intersections. Modern computerized traffic control systems are widely used to monitor intersections where traffic or pedestrians converge. One function of all traffic control systems is to control the flow of traffic through the monitored intersection by providing coordinated red, yellow, and green light cycles to the converging vehicles.

Modern computerized traffic control systems operate in either an open or closed mode. While operating in closed mode a traffic control system considers no input from external sensors and instead relies solely upon preprogrammed algorithms for providing timed light cycles for each traffic lane or sets of traffic lanes that approach a monitored intersection. While operating in closed mode the traffic control system may be preprogrammed to lengthen or shorten green light times for given traffic lanes during different times of the day or during different days of the week. For example, where a main artery of traffic intersects with a residential street carrying less traffic, it is quite common to preprogram the traffic control system to provide a longer green light time for the heavier traffic flow traveling along the main artery in comparison to infrequent traffic present at the intersecting residential street. In a more specific example, it may be desirable to provide a longer green light to a particular set of traffic lanes which are adjacent to a business or school when its occupants thereof are released at predictable times. In this instance it is presumed by the traffic control operator that a certain portion of said released occupants will be entering the adjacent traffic lanes at such predetermined release times, and therefore longer green lights for the adjacent lanes will be desirable during those times of heavy traffic volume.

Flexibility in programming the duration of green light time is intended to make the intersection operate in an efficient manner by maximizing traffic flow where known re-occurring factors that affect traffic volume are present. In any event, a traffic control system operating in closed mode loops through a preprogrammed timed red, yellow, and green light cycle algorithm irrespective of the actual volume of traffic that is present upon the roadway. As such, the efficiency of traffic control systems operating in closed mode is reduced whenever traffic volumes and flows are unpredictable, which is most of the time.

Even though some flexibility can be preprogrammed into traffic control systems operating in a closed mode, one can certainly understand and appreciate the desire for more flexibility in traffic control systems by equipping them with the ability to alter green light times based upon real-time changes in traffic conditions upon the roadway. To this end, communication provisions have been added to traffic control systems which allow them to receive input data from complimentary external sensors that detect vehicles moving about upon the roadway. More specifically, external sensors are utilized to detect vehicles moving in the approaching traffic lanes towards the monitored intersection. When traffic control systems are configured to receive and consider input from external sensors, they are operating in an open mode.

Currently, traffic control systems operating in open mode receive input from sensors such as inductive loops, audible sensors, video cameras, and microwave sensors. Even though each of the aforementioned sensors possesses different functionalities, strengths, and weaknesses, it is the ultimate goal of all such sensors to provide the traffic control system with appropriate "calls" for a green light whenever vehicles are detected upon the monitored sections of the roadway surface. Each type of sensor accomplishes this task by first employing some type of process for detecting a vehicle, and then secondly by outputting a corresponding request to the traffic control system for a green light in a format specified by the traffic control system.

Although traffic control systems operating in open mode have the ability to alter green light times for all monitored lanes approaching the intersection, usually there are operator established maximum green light times for each monitored lane. For example, even though traffic lanes might experience heavy volumes during certain portions of the day, a green light will nevertheless only be displayed for each approaching lane(s) for the established maximum time during each red, yellow, and green traffic light cycle.

Whenever no traffic is detected (in open mode operation) in one or more of the monitored lanes approaching the intersection, generally one of the following two behaviors is preprogrammed into the traffic control system which controls the red, yellow, and green traffic light cycle. The first behavior is where the traffic control system continues to execute the timed loop cycle (similar to a closed traffic control system) and provides a periodic green light to the empty traffic lanes even though no vehicle is detected by the monitoring sensor(s) for said traffic lanes. For example, where a major artery of traffic intersects a smaller less traveled street, the smaller less traveled street would still receive a periodic green light merely because a predetermined amount of time has passed. Of course the frequency or length of green light time may vary as predetermined by the end user operator, but by providing a periodic green light the traffic control system ensures that no undetected or occluded vehicles are accidentally stranded at a red light in perpetuity.

Using the same example as above, in the alternate a second preprogrammed behavior would display a red light to the vacant side street in perpetuity unless movement of a vehicle is detected by the sensor monitoring the approaching lanes of traffic to the side street. These two examples are applicable to any situation where a sensor does not detect a vehicle in one or more lanes of approaching traffic, for example, a left turn lane or a residential side street.

As previously discussed, once the traffic control system is operating in open mode it utilizes external sensors to maximize traffic flow through the intersection. Although each type of external sensor has its individual strengths and weaknesses, one weakness shared by many external sensors is occlusion. Occlusion occurs when a vehicle is detected moving into a user defined zone (in the approaching traffic lanes towards the intersection) but is suddenly "dropped" thereby going undetected by the sensor before the vehicle exits the user defined zone. When occlusion occurs the sensor is unable to determine if the occluded vehicle is still present within the user defined zone. Thus, the user defined zone is presumed to be empty thereby stranding the occluded vehicle at the intersection.

Occlusion may occur whenever there is a malfunction of the sensor or even during normal operation of the sensor where objects such as cross traffic temporarily obstruct the detection signal of the sensor. In any event, occlusions regularly occur when cross traffic, tall vehicles, periodic ghost mages, or other obstructions temporarily block the signal of the sensor.

The following is a detailed explanation of how a vehicle may become occluded by currently known microwave sensors (for example) that do not employ the current invention. Assume a vehicle is approaching a monitored intersection that is currently displaying a red light to the oncoming vehicle. The microwave sensor monitoring the approaching traffic lanes detects the approaching vehicle and makes a call to the traffic control system for a green light. The sensor then suddenly occludes the vehicle because a large semi-truck (with a tall trailer) crosses the intersection thereby obstructing the sensor for a brief time. By the time the tall semi-truck has completed its movement across the intersection, the moving vehicle that was once detected by the sensor is now stopped at the intersection. The present microwave sensor only has the capability to detect objects that are moving, so it no longer detects the stopped vehicle as being present in a user defined zone adjacent to the intersection. This vehicle is now considered to be occluded since it is no longer being detected by the sensor. Normally in this instance when the sensor does not detect any other vehicles approaching the intersection it will cease sending a request for a green light to the traffic control system. In order for vehicles present within the approaching lanes to receive a green light, the traffic control system must be receiving a call for a green light for that specific user defined zone at the exact time the traffic control system is ready to issue a green light to such lanes of traffic. Since the approaching vehicle was occluded before the traffic control system was ready to consider providing a green light, and the sensor is no longer calling for a green light because it no longer detects the presence of a vehicle, the occluded (and now stopped) vehicle would continue to receive a red light and would therefore be stranded at the intersection until the next green light is displayed. The next green light would occur at such time as dictated by the behavior programmed (as discussed above) into the traffic control system. Obviously, this is not a preferred mode of operation since the occluded vehicle, in most cases depending upon its time of arrival at the intersection, will have to wait for a green light for an extended period of time. These extended wait periods cause inefficient traffic movement through the intersection.

It is well known in the prior art of external sensors that user defined zones can be established in areas monitored by an external sensor. User defined zones are usually defined as a left turn lane (where present), a right turn lane (where present), and through lanes. By defining certain parts of approaching traffic lanes as zones, the sensor can precisely monitor exact portions of the approaching traffic lanes.

One way traffic control systems currently avoid occluding vehicles is to simply "lock" the approaching lanes from a given direction whenever a vehicle is first detected anywhere in the approaching traffic lanes for any length of time. Locking the approaching lanes from a given direction has the affect of ensuring that such lanes receive a green light during the next traffic light cycle. The locked lanes become unlocked as soon as they receive a green light during the next traffic light cycle. Locking the traffic lanes is an acceptable solution when in fact a vehicle has been occluded (stranded) within the approaching lanes to the intersection; however, when the detected vehicle has in fact exited the intersection (leaving the approaching lanes empty) the traffic control system nevertheless keeps the lanes locked. The locked traffic lanes will receive a green light in due course even though vehicles may not actually be present within the approaching lanes. When this occurs, placing a lock on traffic lanes approaching from a given direction is not an efficient way to maximize traffic throughput at an intersection.

Since the present invention allows the operator to define zones within the traffic lane approaches to the intersection, the present invention can determine if vehicles are present within each user defined zone. The present invention applies an algorithm to the detection of said user defined zones to make a determination whether a vehicle has been occluded (stranded) at a red light at the intersection. This is accomplished by the microprocessor (located within the sensor housing) executing an algorithm which tracks all vehicles into and out of each user defined zone. In the event the algorithm detects a vehicle entering a user defined zone but does not detect the vehicle exiting the same user defined zone, it determines that the vehicle has been occluded and is thus stranded at the intersection. When such an occlusion event occurs, the affected user defined zone causes a request to be sent to the traffic control system for a green light for the affected user defined zone. This continuous request for a green light will expire as soon as the earlier of a green light is issued by the traffic control system, an operator defined maximum hold time expires, or another vehicle enters the same user defined zone as the occluded vehicle.

Compared to the above scenario where the traffic control system locks the lanes of traffic from a given direction upon the first detection of a vehicle in the approaching lanes (either the left turn lane, right turn lane, or through lanes), the present invention continues to make determinations regarding the traffic status of the user defined zone even after an occlusion has occurred. At the same time the present invention detects that an occlusion has occurred in a user defined zone, a maximum vehicle presence timer becomes operational which continues to send a request for a green light to the traffic control system for the effected user defined zone. Even though a call for a green light is being made to the traffic control system, the sensor has no way of knowing whether or not the occluded vehicle is still present within the user defined zone adjacent to the intersection. With this in mind, the present invention assumes that the occluded vehicle is still present within the user defined zone. In the event the sensor detects a vehicle exiting the user defined zone where it last detected the occluded vehicle, it removes the maximum vehicle presence timer from the affected zone and the call for a green light ceases immediately. If no such vehicle is detected exiting the user defined zone where the occluded vehicle was detected, the request for a green light continues until the first of the following occurs: the traffic control system issues a green light to the user defined zone containing the occluded vehicle, the maximum time allowed for the maximum vehicle presence timer expires, the occluded vehicle is detected exiting the user defined zone, or another vehicle is detected entering the same user defined zone where the occluded vehicle was last detected. The following is an example of the present invention in use.

Assume a vehicle is approaching a monitored intersection in the right turn lane that is currently being displaying a red light. The sensor monitoring the approaching traffic lanes detects the vehicle and makes a call to the traffic control system for a green light. Suddenly, the sensor occludes the vehicle because a large semi-truck (with a tall trailer) crosses the intersection thereby obstructing the sensor briefly. By the time the semi-truck has completed its movement across the intersection, the vehicle that was once detected by the sensor is now stopped at the intersection. Once again, since the present sensor only has the capability to detect items that are moving, the sensor no longer detects the stopped vehicle as being present within the intersection. This vehicle is considered by the sensor to be occluded since the sensor did not detect the vehicle exiting the user defined zone. Ordinarily, if traffic control sensors currently known in the prior art do not detect any other vehicles approaching the intersection within the same user defined zone, they cease sending a request for a green light to the traffic control system the very instant no approaching vehicles are detected. In comparison, when the present invention does not detect any moving vehicles present within the user defined zone but has determined that a vehicle has been occluded, it makes a request for a green light for said user defined zone even though the occluded vehicle is no longer detected. So far the present invention is acting like a traffic control system operating in a "locked" mode (as described above); however, in contrast to a system operating in a locked mode, the present system continues to monitor the user defined zone for movement or approaching vehicles. In the event the system detects the occluded vehicle exiting the locked zone, the sensor ceases sending a request for a green light to the traffic control system thereby freeing the traffic control system to display a green light to other traffic lanes.

In the above example as soon as the sensor detected the occluded vehicle exiting the user defined zone, it assumed that the occluded vehicle has exited the user defined zone and has cleared the intersection. By continuing to monitor the user defined zone and by unlocking said user defined zone when the sensor detects that no vehicles are stranded within the zone, the traffic control system does not display unnecessary green lights to approaching traffic lanes when no vehicles are stranded.

In summary, my invention provides an improved system for maximizing traffic flow through an intersection by better identifying whether or not occluded vehicles are still present within user defined zones of the approaching traffic lanes to an intersection. To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The above mentioned and other features, advantages and objects of this invention, and the manner of attaining them, will become apparent and the invention itself will be better understood by reference to the following description of embodiments of the invention taken in conjunction with the accompanying drawings, wherein:

FIGS. 9A-9D illustrate an example flow chart of a method for operation of the detection zones.

Figure 1:
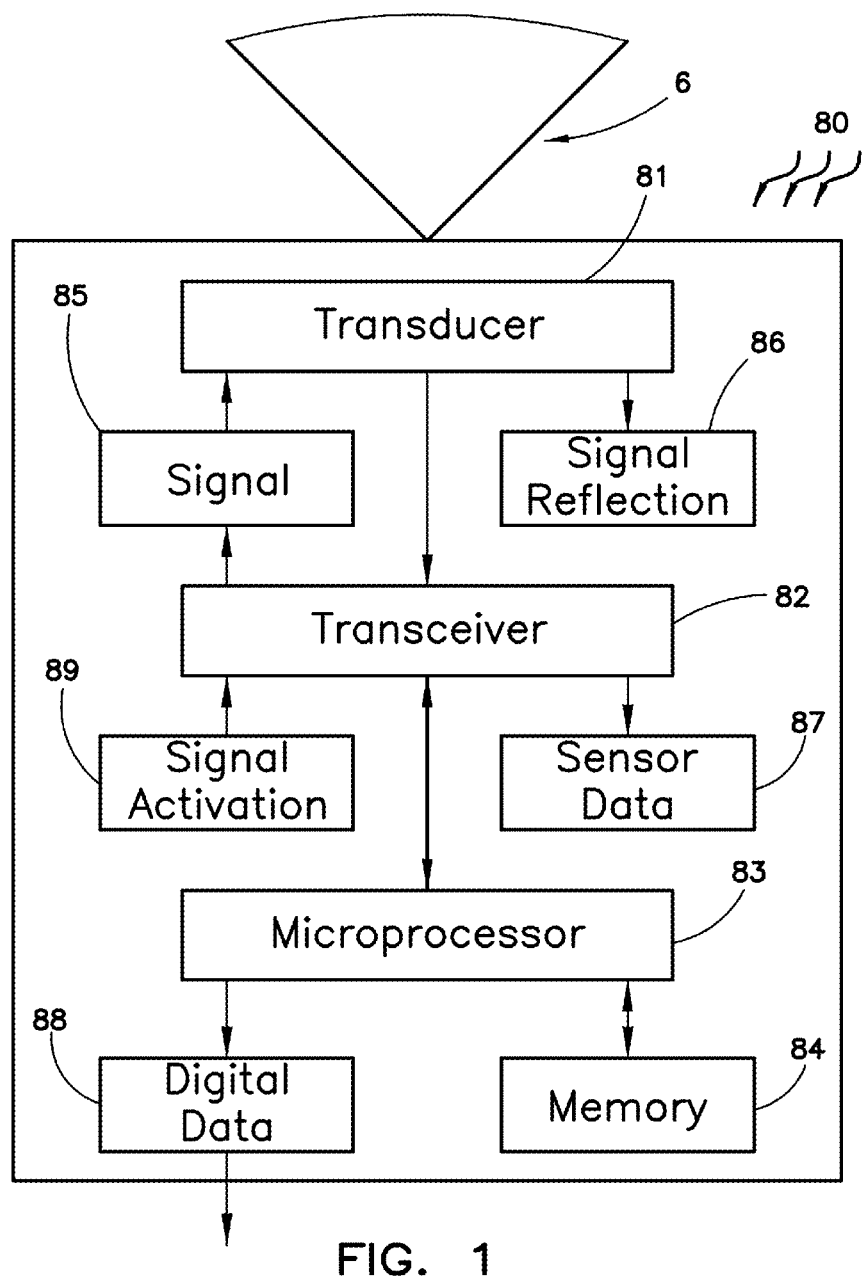
FIG. 1 is a block diagram showing the logic of the radar transceiver as it broadcasts its detection signal upon a Cartesian table.

Like reference numerals indicate the same or similar parts throughout the several figures. A discussion of the features, functions and/or configuration of the components depicted in the various figures will now be presented. It should be appreciated that not all of the features of the components of the figures are necessarily described. Some of these non discussed features as well as discussed features are inherent from the figures. Other non discussed features may be inherent in component geometry and/or configuration.

DETAILED DESCRIPTION OF AN EMBODIMENT OF THE INVENTION

The present invention is a system and method for a traffic control sensor system that becomes integral with a separate traffic control system operating in open mode. The present traffic control sensor system is further defined as one or more standalone microwave radar transceivers ("sensors") and a cooperative electronic data bus card ("Traffic Control Interface Card" or "TCIB"). The sensor is in electrical communication with the TCIB via an Ethernet cable, and electrical connectors of the TCIB are in electrical connection with the traffic control system via its electrical communicative slot resident upon the motherboard of the traffic control system.

The traffic control sensor system of the present invention utilizes one or more microwave sensors (sensors) to detect non-stationary vehicles moving across the monitored piece of roadway or surface which carries vehicles. For purposes of the present invention, a pedestrian on foot, skateboard, bicyclist, or other mobile vessel is also considered a vehicle. Specifically, said non-stationary vehicles sought to be detected are those approaching the monitored intersection.

The traffic sensor control system is described in detail as follows: referring to FIGS. 1, 2, 3, and 5, the traffic control sensor system is comprised of a sensor 80 and a TCIB 9. The sensor 80 utilized in the present invention is an Intersector TC-CK1-SBE manufactured by MS Sedco, Inc. The TC-CK1-SBE has a horizontal detection width of thirty degrees, and a typical range of four hundred feet. The transducer 81 end of the traffic sensor 80 should be pointed in the direction of the oncoming traffic to be monitored and should be tilted at a tip angle between horizontal and four degrees downward slope, plus or minus the road slope to be monitored.

Referring to FIG. 1, the sensor 80 is comprised of microprocessor 83 which cooperates with a transceiver 82. A short signal activation 89 prompt is sent to the transceiver 82, which then generates a signal 85 which is routed through the transducer 81 as a microwave signal 6 which is transmitted into the atmosphere. The transmitted signal is a Frequency Shift Keyed ("FSK") radar signal that is generated via direct digital synthesis and frequency multiplication.

Said transducer 81 receives reflected microwave signals 86 back from the transmitted microwave signal 6 and transmits said reflected signals to the transceiver 82. The transceiver 82 sends the sensor data 87 to the microprocessor 83 which converts the sensor data into X,Y Cartesian coordinate data for each vehicle 4 detected. The microprocessor 83 also assigns a unique sequential numeric identifier for each detected vehicle, and also records the vehicle's 4 approaching speed at that moment of detection.

This X,Y Cartesian coordinate data stream, including the unique identifiers and speed of the approaching vehicles, is transferred to memory 84 until such time as it is transferred to microprocessor 21 for further processing as a digital data stream 88, approximately once every 50 milliseconds. It is worth noting that microprocessor 21 could instead be located within the TCIB 9 instead of the sensor 80 housing where microprocessor 22 is also located. Moving microprocessor 21 to the TCIB 9 would not affect the functionality of the present invention.

Figure 2:
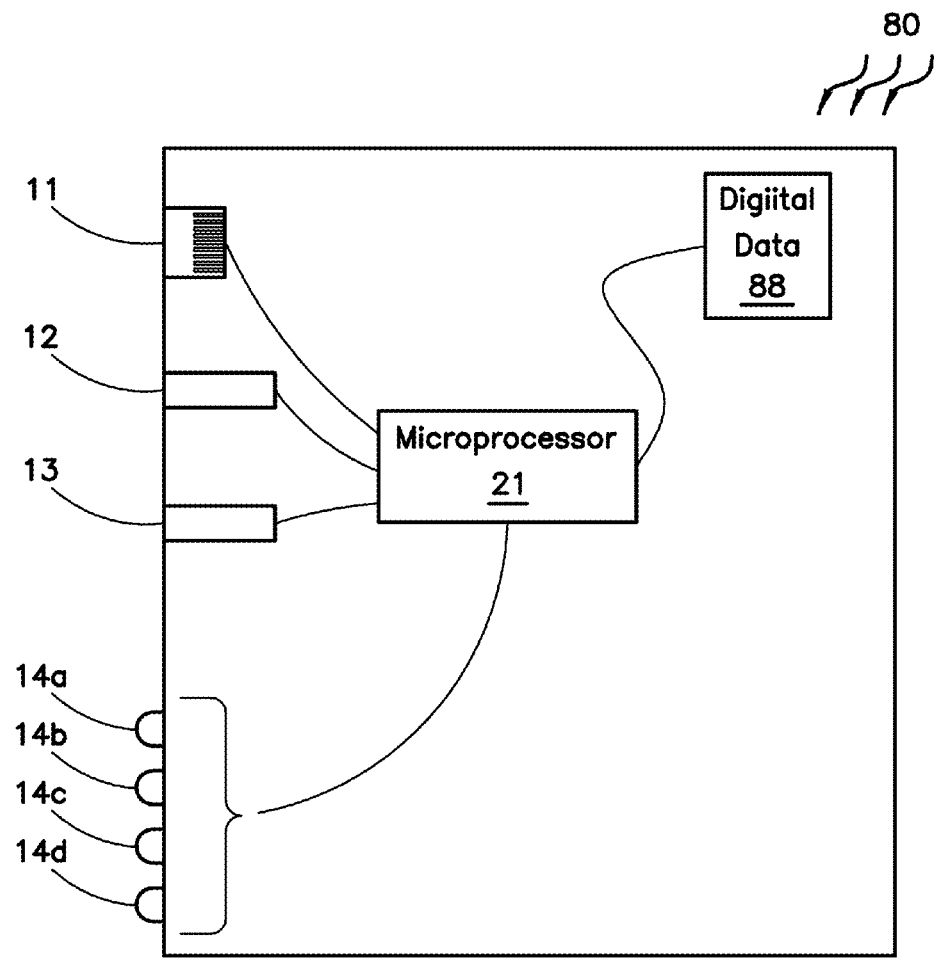
FIG. 2 is a top view of an electrical component board (installed within the sensor) which shows the led indicators as well as the connectors which are present upon the sensor.

FIG. 2 shows the service and diagnostic panel of the sensor 80. Said diagnostic panel includes an Ethernet connection 11, an RS232 port 12, a controller area network (CAN) port 13 for diagnostic purposes, and LEDs 14a through 14d which separately illuminate in correlation to the triggering of one to four opto-isolated output channels from microprocessor 21. LED 14a will illuminate whenever a vehicle is detected in channel 1, LED 14b will illuminate whenever a vehicle is detected in channel 2, LED 14c will illuminate whenever a vehicle is detected in channel 3, and LED 14d will illuminate whenever a vehicle is detected in channel 4.

The TCIB 9 of the present invention shares a complimentary form factor as established by the National Electrical Manufacturers Association (NEMA) standards body. So long as the traffic control system complies with NEMA standards, and the form factor of the external bus card to be integrated therewith complies with NEMA standards TS-1 and TS-2 which specify allowable form factors for external bus cards, the TCIB 9 may be successfully integrated into the traffic control system. Currently NEMA standards TS-1 and TS-2 mandate that inputs received from external sensors be limited to outputting four 4 opto-isolated communication channels. Although the TCIB 9 does conform to the aforementioned NEMA standards, it could of course be easily reconfigured to become integral with non NEMA compliant traffic control systems.

Figure 3:
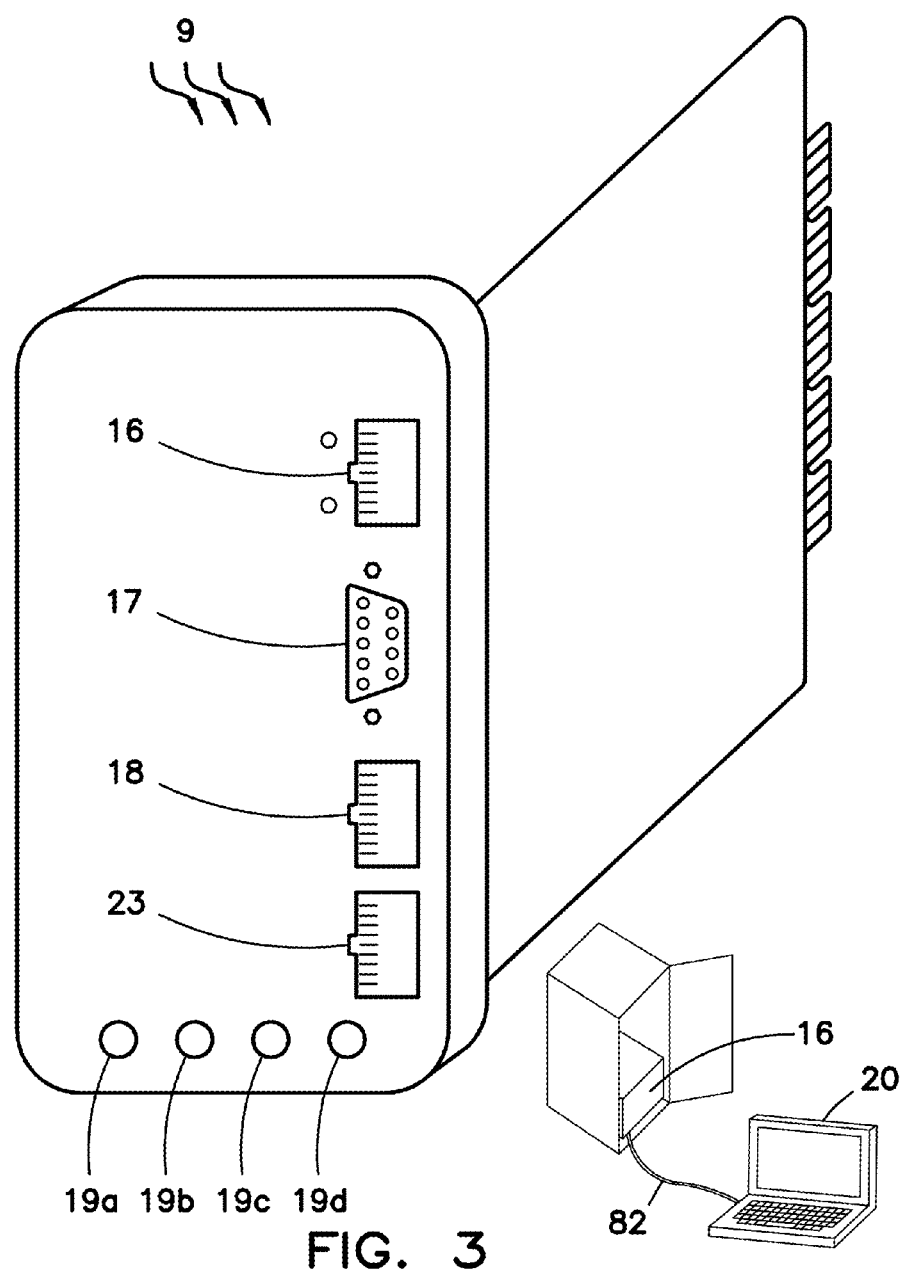
FIG. 3 is a front view of a TCIB as uninstalled. This view shows the mounting slots, the led indicators, and the connectors which are present within the TCIB.
Figure 4:
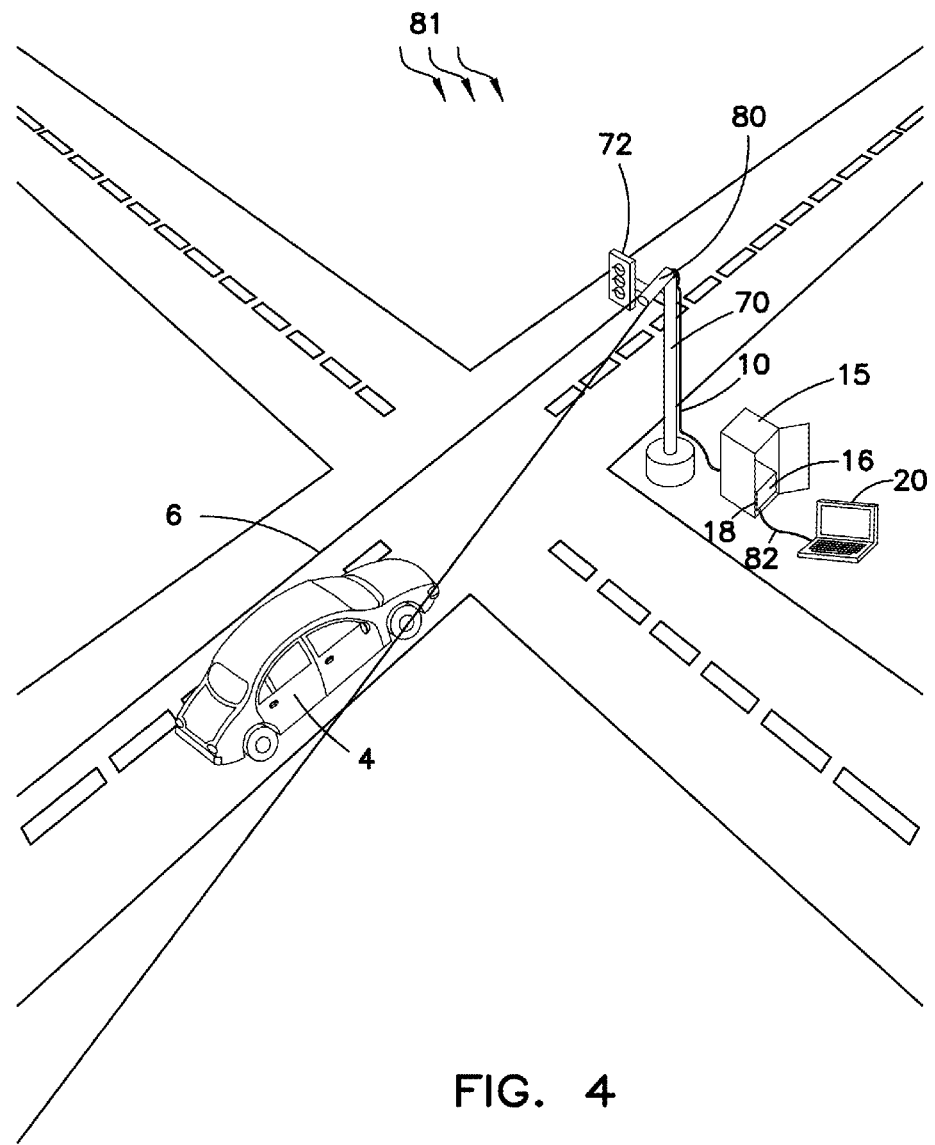
FIG. 4 is an overhead view of a monitored intersection where a sensor is monitoring oncoming traffic in one lane of the intersection. This drawing also shows the traffic control box as well as a laptop computer which is utilized to configure the traffic monitoring system.
Figure 5:
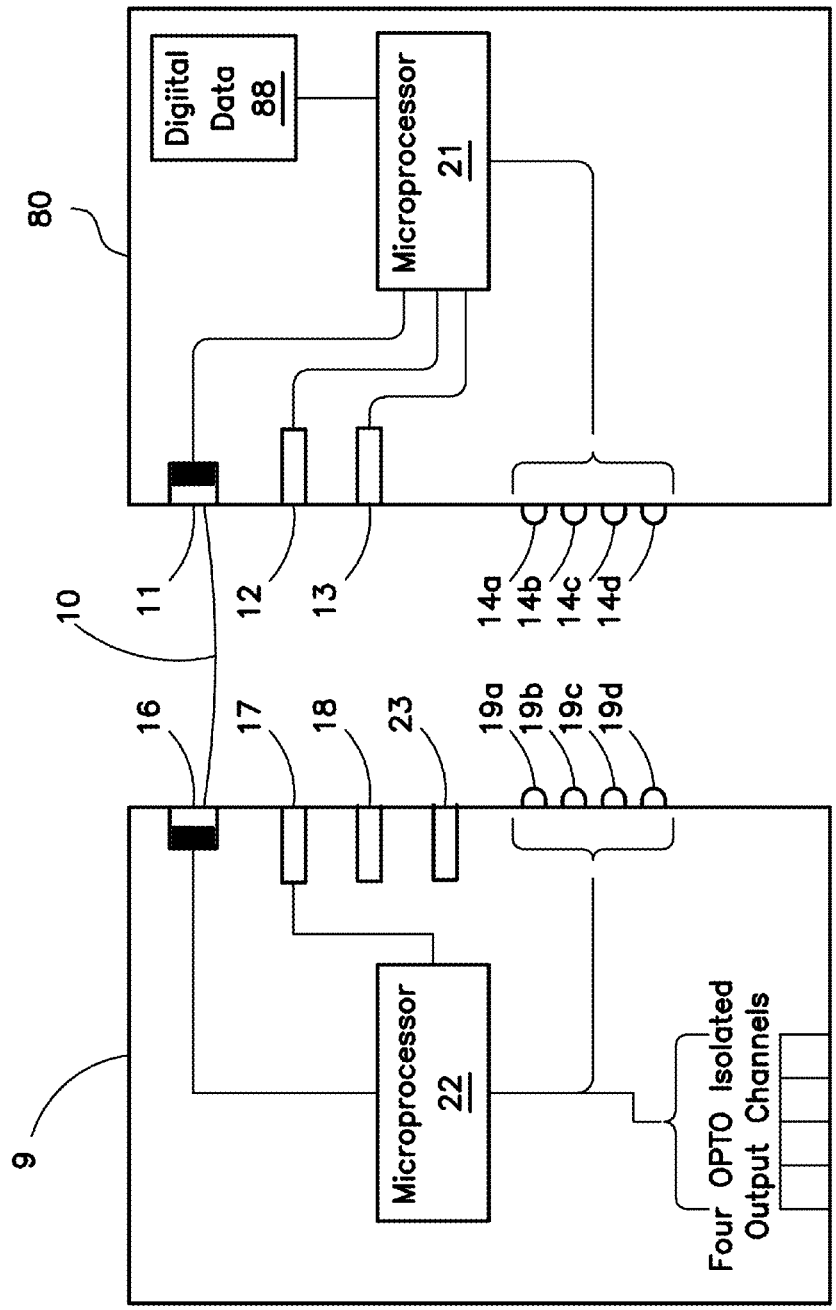
FIG. 5 is a top view of an uninstalled TCIB and an uninstalled printed circuit board which are in electrical connection with an Ethernet cable.

Referring to FIGS. 3, 4 and 5, the service port of the TCIB 9 is shown. The TCIB 9 is installed within and configured to communicate with the control cabinet 15 of the traffic control system. The edge slot connectors on the TCIB 9 are engaged with compatible data slots found in NEMA compliant control cabinets 15. For each sensor 80 employed in the traffic control system, one TCIB 9 must be installed within a slot of the control cabinet 15 in order for each traffic sensor 80 to communicate with said control cabinet 15. Once installed inside of the traffic control box 15 (see FIG. 4), during normal operation the control box 15 provides operable electrical power to the TCIB 9, and also to the sensor 80 by providing twenty-four volts of power over Ethernet cable 10 from connector 16 of the TCIB 9 to connector 11 of the sensor 80. Said Ethernet cable 10 is normally UV protected and gel filled with ODVA IP67 compliant connectors.

Now referring to FIG. 3, the TCIB 9 also incorporates LEDs 19a through 19d which each represent one of the four channels outputted from the microprocessor 22 resident within the TCIB 9 (See FIG. 5). LED 19a represents channel 1, LED 19b represents channel 2, LED 19c represents channel 3, and LED 19d represents channel 4. In operation LEDs 19a through 19d will illuminate whenever a vehicle is detected within each of the four channels. In fact, during operation illumination of LEDs 19a through 19d should mirror the illumination of LEDs 14a through 14d (See FIG. 2) located on the sensor 80 since both sets of LEDs are sensing the same data traffic through each of the four channels. For example, if a vehicle is detected in user defined zone 1, and user defined zone 1 is associated with channel 1, LED 19a will illuminate at approximately the same time as LED 14a also illuminates. User defined zones are fully explained below.

FIG. 4 shows an exemplary intersection where sensor 80 has been mounted upon the vertical pole 70 support for the traffic lights 72 which are a part of the traffic control system for the intersection 81. The operational mounting height of the sensor 80 should be between fourteen and nineteen feet above the roadway surface. The sensor 80 transmits signal 6 outwardly in a substantially radiated conical pattern. The installed position of the sensor 80 is considered to be located at 0, 0 (X,Y) Cartesian coordinates. The boundaries of the Cartesian table are limited to the sensor's 80 transmitted microwave signal pattern. The width and length of the sensor's 80 transmitted signal 6 pattern may be operator adjusted by varying the installed height of the sensor 80, the offset angle of the sensor 80 relative to the approaching traffic, and the degree of downward tilt of the sensor 80 in relation to the approaching roadway surface.

Referring once again to FIGS. 2, 3 and 4, to configure the traffic control sensor system, one end of Ethernet cable 10 is plugged into sensor 80 connector 11 while the other end of Ethernet cable 10 is plugged into an Ethernet port 23 on the TCIB 9. Another Ethernet cable 82 is connected between an Ethernet port incorporated within an external laptop computer 20 and Ethernet port 18 of the installed TCIB 9. In this mode of configuration the laptop computer 20 operates in direct data communication with the sensor 80 in order to configure said sensor 80 using computer software located and operational within the laptop 20. After configuration of the sensor 80 is complete, the end of Ethernet cable 10 that was plugged into port 23 is removed from port 23 and inserted into port 16 of the TCIB 9. In this electrical configuration the sensor 80 and TCIB 9 are placed in operational mode. After configuration Ethernet cable 82 is disconnected and no longer used during normal operation of the TCIB 9 and sensor 80. The TCIB 9 also incorporates a RS232 serial port 17. Within the internet protocol properties page of the operating system of the personal computer 20, the IP address and Subnet mask are manually changed. The IP address is changed to 192.168.0.99, and the subnet mask is changed to 255.255.255.0. After making these changes to the personal computer's 20 operating system, the personal computer 20 is able to communicate with microprocessor 21 located within the sensor 80 housing.

Figure 7A:
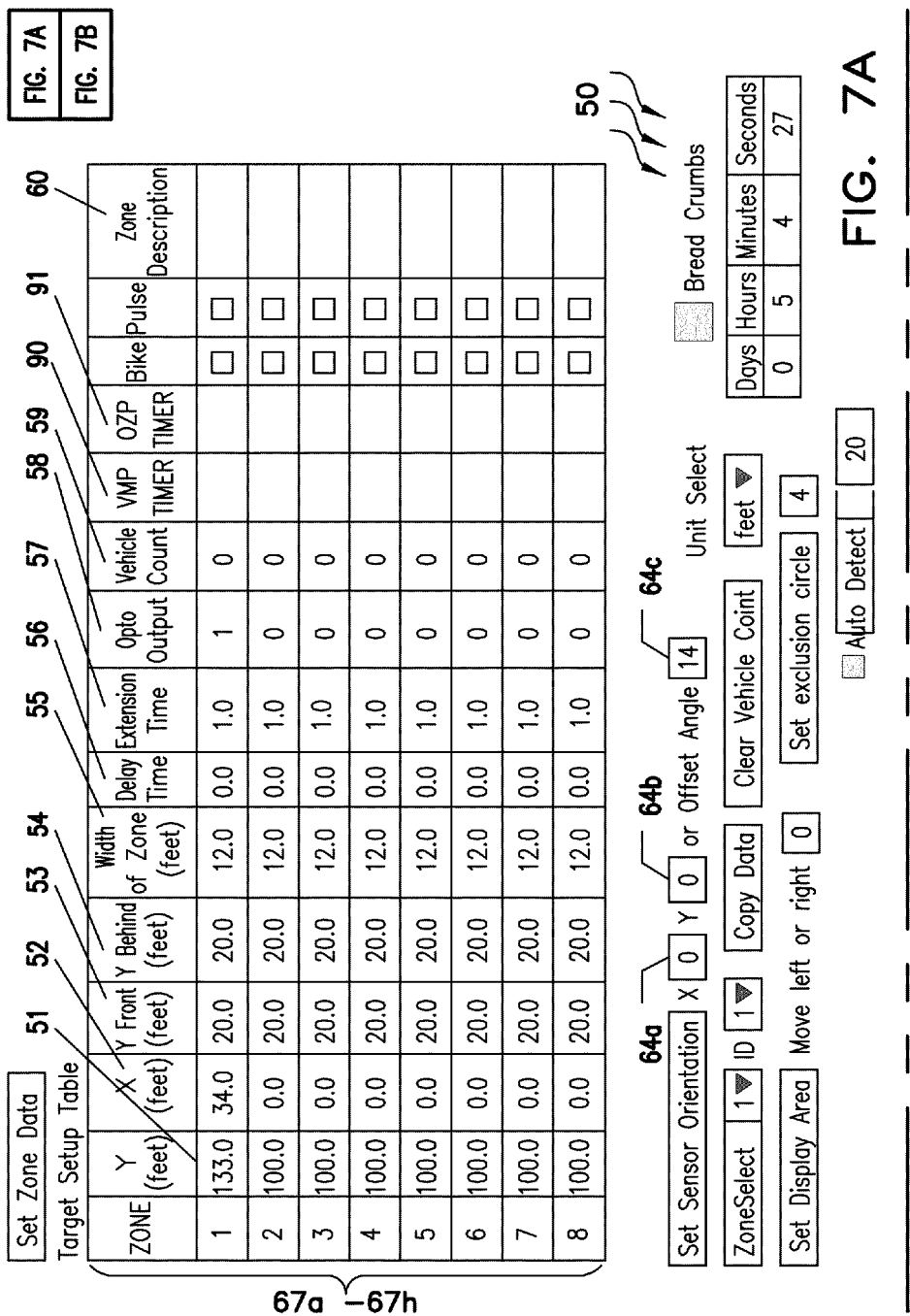
FIG. 7 is a screen shot of an approach as defined in the graphic user interface. This screen shot also shows one traffic zone defined by one traffic sensor.
Figure 7B:
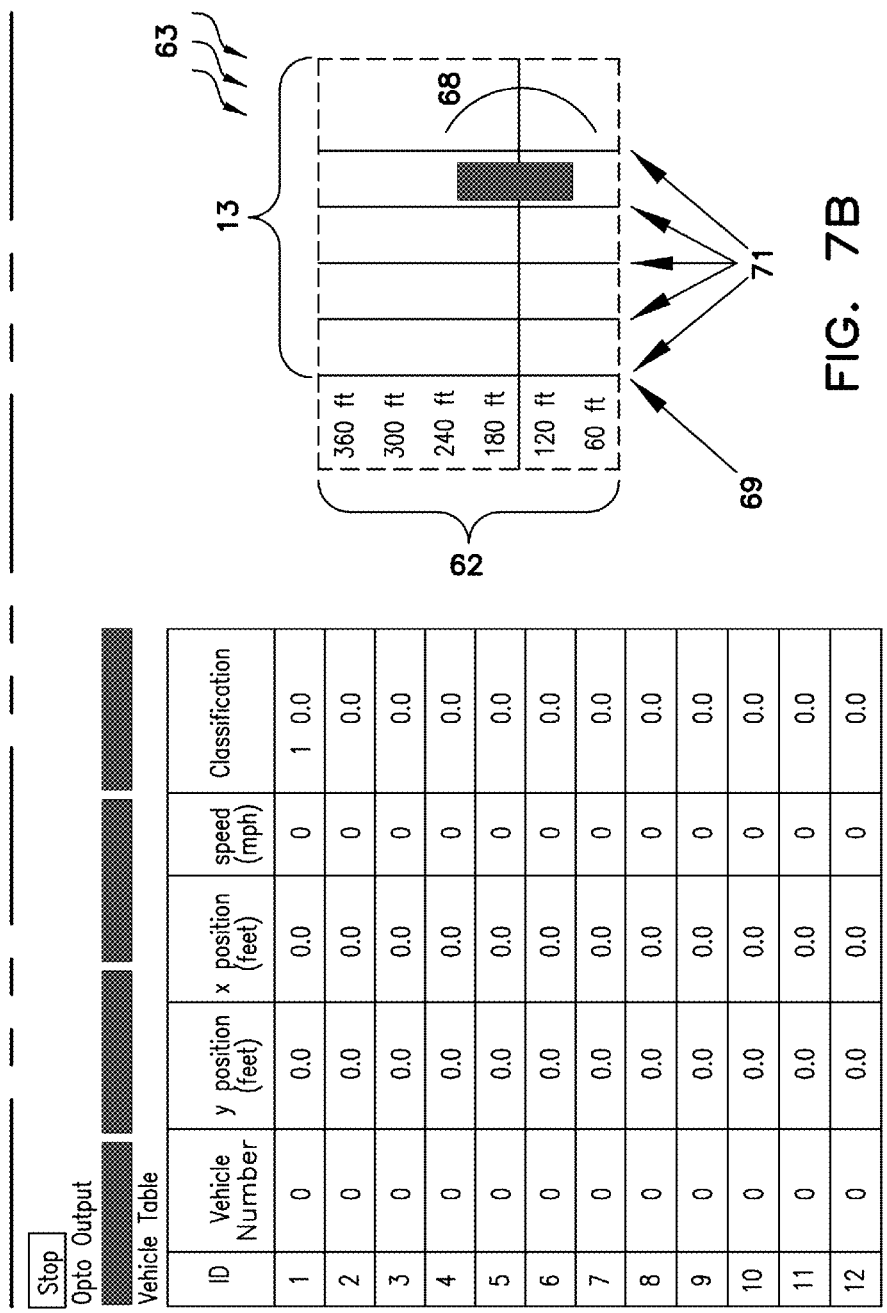

Now referring to FIGS. 1, 4 and 7, by establishing a data communication connection between the personal computer 20 and microprocessor 21, a graphical user interface ("gui") 50 is generated by an algorithm executing within the microprocessor 21. The gui 50 is displayed upon the screen of the personal computer 20 for manipulation by the operator.

Consider the scenario where the approaching traffic is comprised of multiple traffic lanes approaching the monitored intersection from a single direction. The operator may have a need to designate each approaching lane as a separate user defined zone. This delineation would allow the operator to better track the specific volume and speed, as well as other characteristics of the approaching vehicles within a given user defined zone (traffic lane). Zones may be established as any four sided square (or rectangle) utilizing the X,Y coordinates present within the transmitted digital data stream 88 signal from the sensor 80.

Referring specifically to FIG. 7, a sample screen shot of the gui 50 generated by the personal computer 20 is shown. In the right portion of the screen is a table 63 which shows a graphical representation of the approaching traffic lanes of the intersection to be monitored. The table 63 is defined as having a Y axis 62 and an X axis 70. The Y axis 62 is labeled by a progressive increasing measurement in feet as the distance along the Y axis 62 increases in relation to the sensor 80 (0,0-X,Y coordinates) which is located at position 69. As the distance along axis X increases (to the right) from the sensor 80 (position 69), it too is measured in a progressive distance of feet (although not labeled in the screen shot). At regular intervals along the X axis 70 are lines 71 extending upward in a parallel manner to the Y axis 62. Said predefined lines 71 represent guidelines for displaying the approximate boundaries of each traffic lane to be monitored.

Said gui 50 provides several user defined fields which must be completed by the operator to establish parameters of operation within the microprocessor 21. A plurality of user defined zones 67a through 67h (zones 1 through 8) may be defined by the user to define boundaries of the monitored zones within the approaching traffic lanes to the monitored intersection. For example, the completion of Fields 51 through 60 for zone 67a represent the boundaries to be monitored for zone 1. The completion of Fields 51 through 60 for zone 67b represent the boundaries to be monitored for zone 2, and so on. The shape of each user defined zone is a four sided square or rectangle. It should also be noted that there may be more than one user defined zones (67a-67h) defined within a single lane of traffic. For example, in a single traffic lane the operator may define zone 67a as an area which is farther away from the traffic light where 67b may be defined as a zone which is directly adjacent to the stop bar. Of course the operator is free to defined each of the eight zones as he chooses anywhere within the table 63.

Field 51 "Y feet" requires a numeric value in feet which defines the starting point on the Y axis 62 where the selected zone 68 will be positioned.

Field 52 "X feet" requires a numeric value in feet which defines the distance along the X axis 70 where the user defined zone 67a-67h will be positioned in relation to the sensor 80. The value in field 52 represents the physical middle of defined zone along the X axis 70.

Fields 51 and 52 taken together define the middle of the front (the side closest to the sensor 80) starting point along the X axis 70, and the length to which the zone extends rearward along the Y axis 62. For example, assume value 133 is entered in field 51 and value 34 is entered in field 52. These values taken together establish the X-Y coordinates of 34,133, meaning that the starting point of the middle of the front portion of this particular zone starts at 34 feet along the X axis 70, and extends rearward 133 feet along the Y axis.

Field 53 "Y front feet" requires entry of a numeric value to define the distance in feet that will be subtracted from the value in Field 51 which will have the effect of moving the front portion of the zone closer to the sensor 80. For example, assume the value of 20 is entered into field 53, this means that the front of the zone (the part closest to the traffic sensor 80 along X axis 70) will be 113 feet from the traffic sensor 80 along Y axis 62. The value of 113 feet is derived by subtracting the amount in field 53 (20 feet) from the previously entered amount in field 51 (133 feet).

Field 54 "Y behind feet" requires a numeric value to define the distance in feet that will be added to the value in Field 51 to extend the rear of the zone (the portion farthest from the traffic sensor 80 located at position 69) farther away from the traffic sensor 80 along the Y axis. For example, assume the value 30 is entered into field 54. This means that the rear of the zone will be 163 feet from the traffic sensor 80 (133 feet entered in field 51, plus the 30 feet entered in field 54). Having Fields 53 and 54 separate from each other is advantageous to the user in that it greatly simplifies fine tuning of the length for each zone along the Y axis 62. For example, assume that the user desired to extend a zone to a point farther away from the sensor 80 along the Y axis 62, the value in Field 54 could be increased while leaving the value in Field 53 (the front of the zone) undisturbed.

Field 55 "Width of Zone Feet" requires a numeric value which establishes the total width of the defined zone along the X axis. For example, assume the value of 12 has been entered into field 55 for the zone (67*a*) we are currently defining. The value in field 52 (34 feet) represents the center of the zone width along the X axis. As such, half of the value in Field 55 is added to the value in field 52 thereby creating the right boundary of the zone, and half of the value in Field 55 is subtracted from the value in field 52 thereby creating the left boundary of the zone. By performing the aforementioned two calculations, the value entered in field 52 becomes exactly the center of the zone to be monitored. Assume field 55 contains the value 12 and field 52 contains the value 34. By performing the aforementioned calculations, 1) the left boundary of the zone would start at 28 feet (34 feet minus (12 feet divided by 2)) along the X axis, and 2) the right boundary of the zone would extend to 40 feet (34 feet plus (12 feet divided by 2)) along the X axis. Thus, the width of the zone to be monitored would be the exact value entered in field 55, and the exact middle of the zone along the X axis would be the value entered in field 52.

By performing the above calculations given the values placed in fields 51 through 55 above, the boundaries for each corner of each user defined zone can be determined. In our example the leftmost front corner (in relation to the sensor 80 at position 69) of the user defined zone is located at 28,113 X-Y coordinates, the rightmost front corner of the user defined zone is located at 40,113 X-Y coordinates, the leftmost rear corner of the defined zone is located at 28,163 X-Y coordinates, and the rightmost corner of the user defined zone is located at 40, 163 X-Y coordinates.

The table 63 displays a shaded box 68 sized to display said boundaries in the corresponding defined location upon the table 63 for each user defined zone 67*a*-67*h*. As the sensor 80 detects a vehicle 4 entering a user defined zone, the corresponding shaded box 68 for said zone changes color (is highlighted) to indicate detection has occurred within said user defined zone. As the vehicle 4 exits said highlighted user defined zone the shaded box 68 reverts back to its initial color displayed when no vehicle 4 is detected within said user defined zone.

The numeric value entered in field 56 "Delay Time" is in seconds and acts as the amount of delay necessary before the TCIB 9 recognizes and displays a vehicle 4 detected by the traffic sensor 80 upon the table 63. For example, the operator may desire that the TCIB 9 display only vehicles that are detected by the sensor 80 for longer than the time entered into field 56. The value in this field may need to be greater than zero when a particular user defined zone 67*a*-67*h* prone to radar ghosting effects. Radar ghosting effects are described as the sporadic detection of objects upon the roadway surface for a brief period of time when in fact no such objects actually exist. Ghost images can occur for various reasons such as unpredictable reflection and receipt of the sensor's 80 transmitted signal 6, or when a stationary object has reflective properties adjacent to or upon the roadway interfere or obstruct the transmitted signal 6. Where ghost images are not a problem typically this field is set to zero seconds.

The numeric value entered in field 57 "Extension Time" is in seconds and acts as the amount of time the detected vehicle 4 is displayed on the table 63 after said vehicle 4 leaves the zone where it was last detected by the sensor 80 and displayed upon the table 63.

The Opto Output field 58 requires a numeric entry of 1 through 4 which identifies the opto output channel 19*a*-19*d* associated with that specific user defined zone 67*a*-67*h*. It is worth mentioning that more than one user defined zone may share a single opto out channel 19*a*-19*d*. When two or more user defined zones share the same opto output channel, that opto out channel will become activated upon a vehicle 4 entering any of the user defined zones associated with the designated opto output channel.

Field 59 is simply a counter which tracks the number of vehicles tracked within that particular user defined zone since the last time the counter was reset to zero.

Field 60 allows an alphanumeric entry which acts as a description of the user defined zone. Typical entries would be "Left Turn Lane", "Right Turn Lane", "Through", or any other identifier which assists the operator.

Fields 64*a*-64*c* must be completed in order for the gui 50 to locate the sensor 80 in relation to the table 63. Field 64*a* represents the numeric coordinate along axis X where the sensor 80 is positioned. Field 64*b* represents the numeric coordinate along the Y axis there the sensor is positioned. The user can enter X and Y and the offset angle will be calculated or if know the offset angle can be entered directly. The offset angle represents the relative angle of the sensor to the road.

Now referring once again to FIG. 4, in its simplest form of operation the sensor 80 is installed and positioned to detect vehicles 4 as they approach the monitored intersection 81. The sensor 80 plots each approaching vehicle 4 as a two dimensional X-Y Cartesian coordinate (typically using the approximate front center portion of the vehicle as the X,Y point of identification). The sensor 80 also assigns a numeric identifier to each detected vehicle 4 and sends the data stream 88 (see FIG. 1) to the microprocessor 21 located within the sensor housing (see also FIG. 5). The algorithm executing within the microprocessor 21 determines if any of the detected vehicles 4 are present within any of the user defined zones 67*a*-67*h* (see FIG. 7). Each user defined zone must be assigned an opto-isolated 19*a*-19*d* output value of one through four. The number of opto-isolated outputs is limited to four because current traffic control systems are limited to accepting input from no more than four separate opto-isolated outputs. The user defined zones are established by the user defining virtual boundaries within the graphical user interface 50 which is a part of the aforementioned algorithm.

Whenever a vehicle 4 is detected within a user defined zone 67a-67h, the opto-isolated output 19a-19d assigned to the occupied user defined zone is triggered thereby sending "on" signal to the TCIB 9. The TCIB 9 then sends the "on" signal to the traffic control system which recognizes the "on" signal as a call for a green light for the affected user defined zone 67a-67h.

Referring back to FIG. 1, in operation a vehicle 4 detection occurs when the traffic sensor 80 transmits a signal 6 into approaching traffic lanes and then receives a reflected signal off of a portion of each approaching vehicle 4. The sensor 80 has filters which cause it to exclude from detection cross traffic and traffic that is traveling in a direction away from the sensor 80. If the sensor 80 receives a signal that is reflected off of an approaching vehicle 4, then detection has occurred. The entire vehicle 4 need not be detected for detection to occur. Furthermore, so long as the vehicle 4 is detected for a period of time greater than any delay time 56 (see FIG. 7) a continued sequence of detections of the vehicle 4 is not necessary for a detection to occur.

Figure 6:
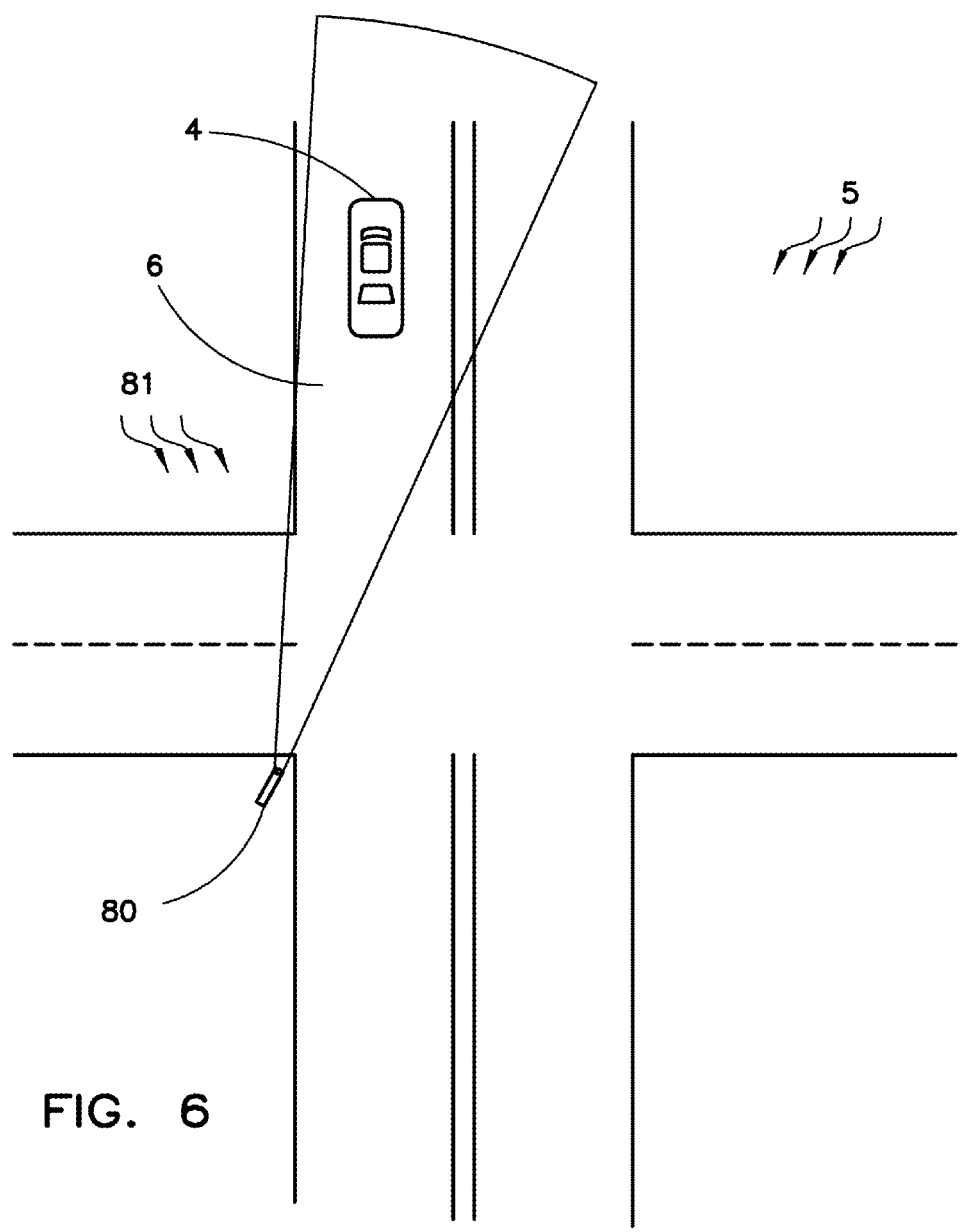
FIG. 6 is an overhead view of an intersection monitored by one sensor. A vehicle is seen approaching the intersection and has entered the detection zone of the sensor.

FIG. 6 shows a typical intersection where a sensor 80 has been installed to monitor traffic lanes approaching the same intersection 81 shown in FIG. 4. As vehicle 4 approaches the intersection it is detected by sensor 80. The vehicle's 4 location is determined by sensor 80 by mapping said vehicle's 4 location as an X,Y Cartesian coordinate within the intersection 81. Also referring to FIG. 1, the sensor 80 continuously detects changes in the approaching vehicle's 4 location and transfers said sensor data 87 to microprocessor 83 which sends 1) the X-Y location of the vehicle 4, 2) the unique sequential numeric identifier assigned to the detected vehicle 4, and 3) the vehicle's 4 approaching speed at that moment of detection to memory 84 until such time as the digital data stream 88 is transmitted to the microprocessor 21 for further manipulation.

Figure 8:
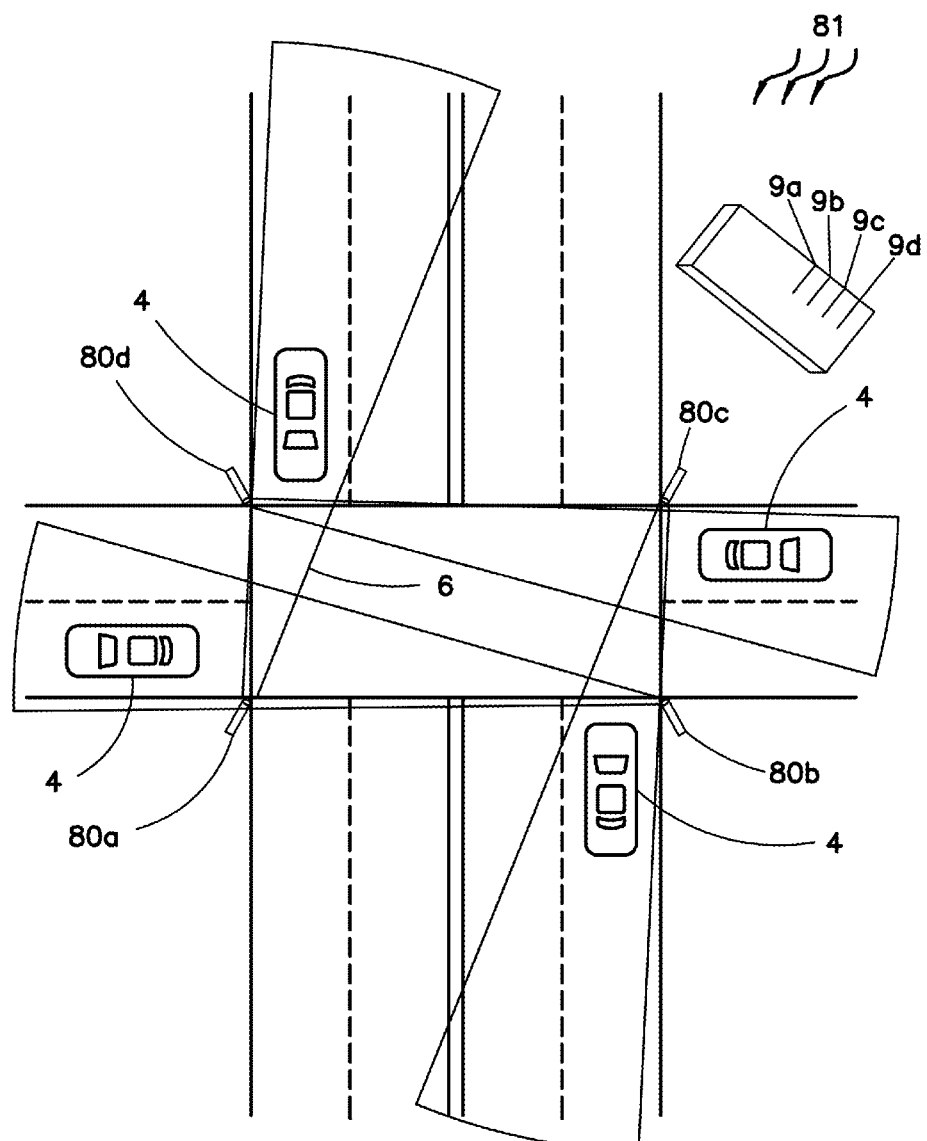
FIG. 8 is a top view of multiple transceivers as positioned to monitor all approaches to an intersection. This sample intersection to be monitored consists of two lanes of traffic in one direction and one lane of traffic in the other direction (crossroad).
Figure 9B:
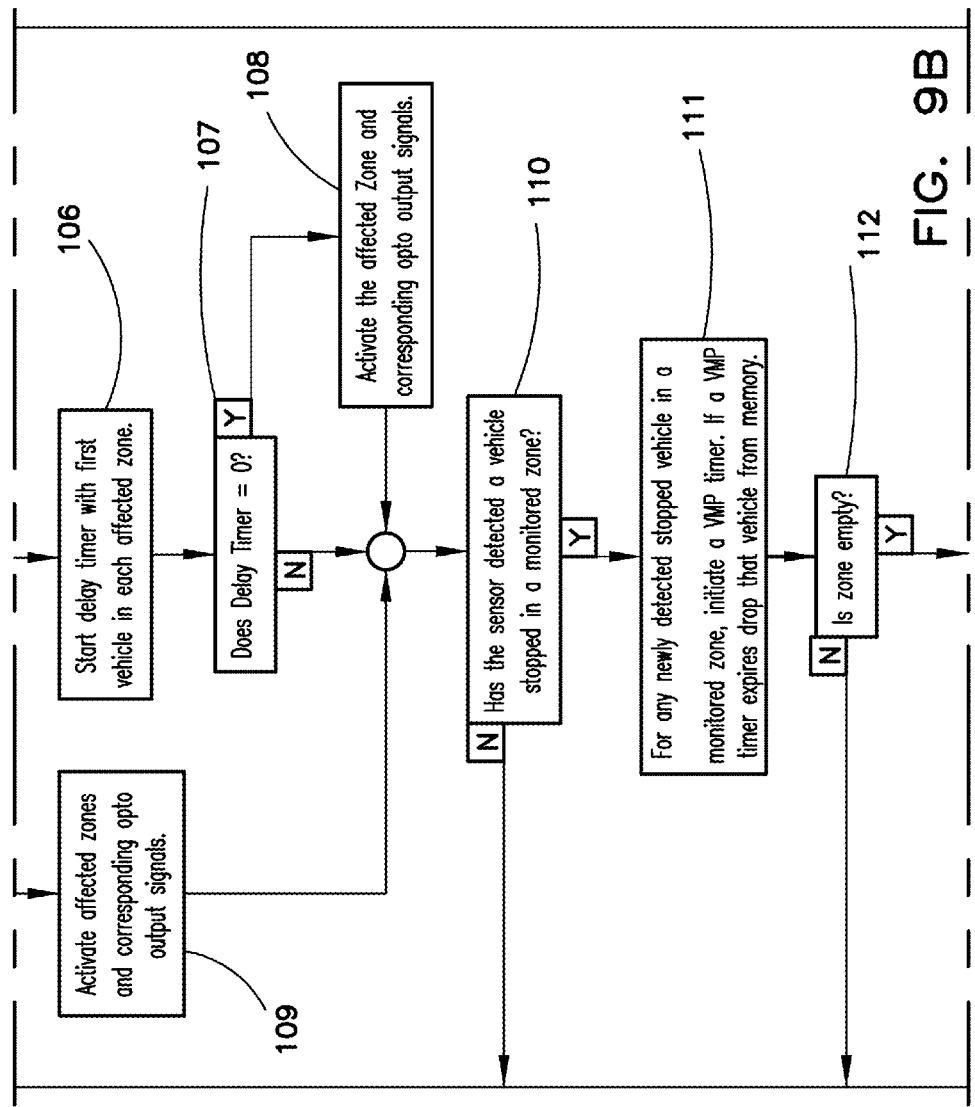
Figure 9C:
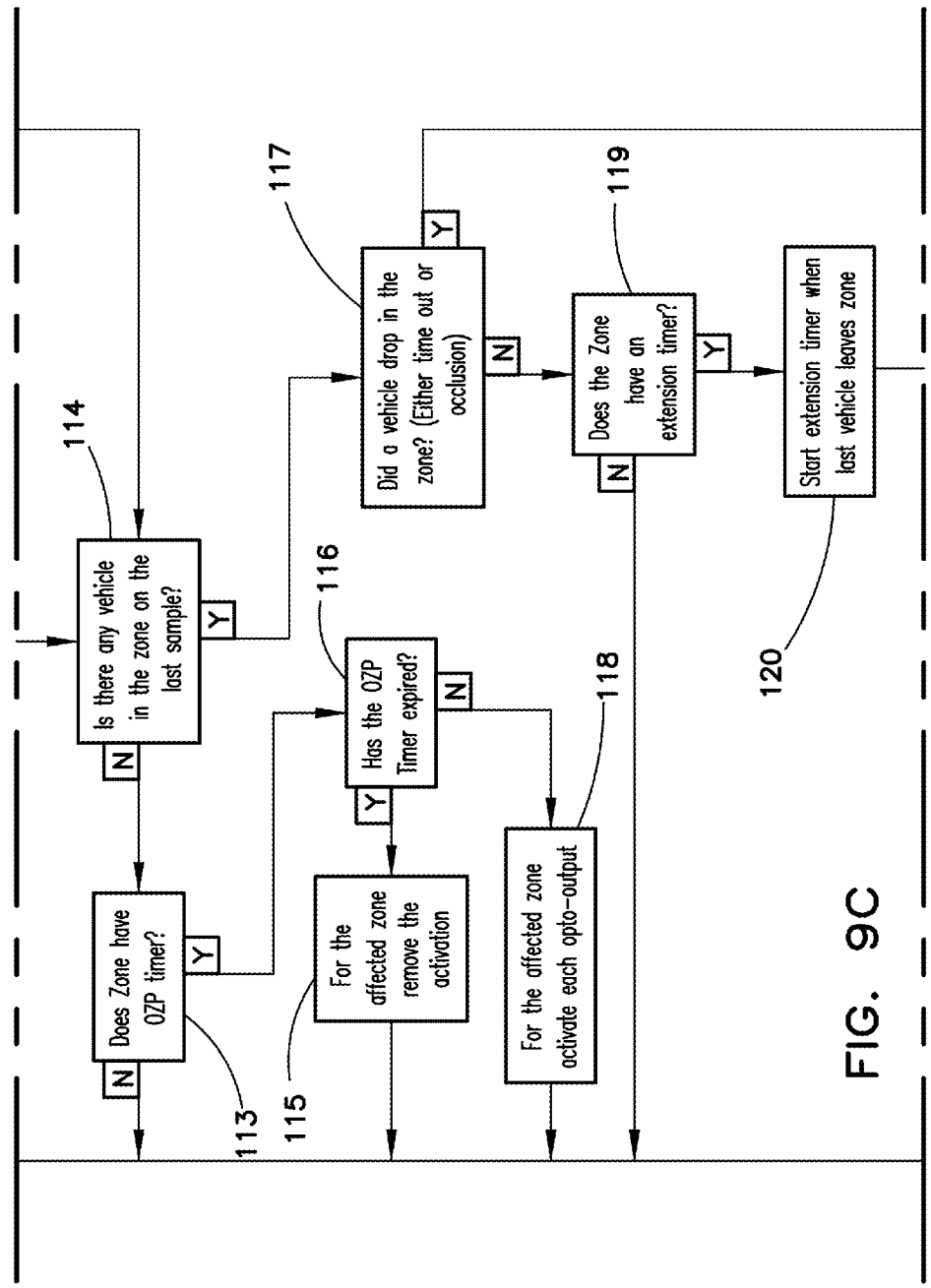
Figure 9D:
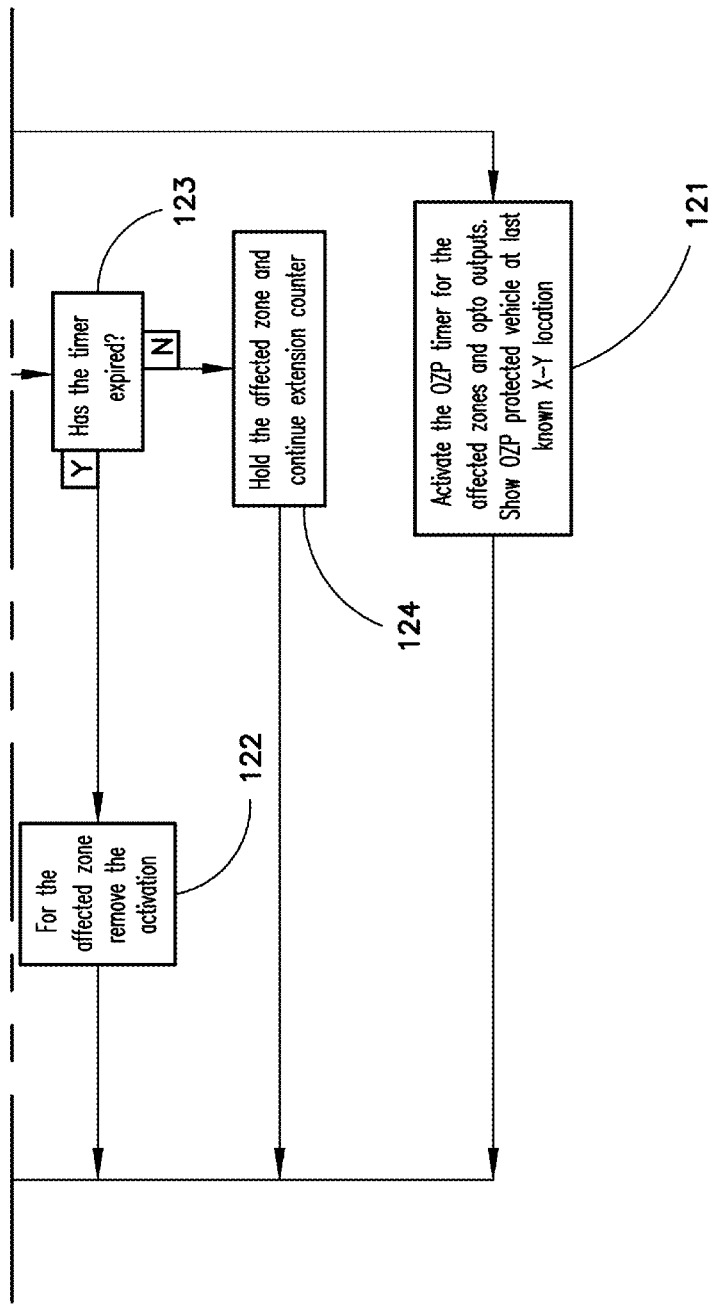

Referring to FIG. 8, an intersection 81 is shown which has installed four sensors 81a-81d installed at positions necessary to detect approaching traffic from all four directions of traffic which approach the intersection. One TCIB 9a-9d (and one gui 50) would be required for each installed sensor 80a-80d. Each TCIB 9a-9d would be installed within and interface with the traffic control cabinet 15 separately from the other sensors 80a-80d. Each sensor 80a-80d will request green lights for the user defined zones configured within its gui 50. The traffic control system will process and coordinate the various requests for green lights made by each TCIB 9a-9d.

Thus far the components of the traffic control sensor system have been identified. The manner in which these components communicate with each other has been explained, and the general process for detecting a vehicle and reporting said detection to the microprocessor 83 has been explained. The looping algorithm which executes within the microprocessor 83 for the continuous detection of vehicles 4 will now be explained below. It is this algorithm which processes vehicle 4 detections and makes various requests for green lights from the traffic control box 15.

Reference is now made to FIGS. 9A-9D which collectively illustrate a flow chart of a method 100 of collecting and processing sensor 80 data. Method 100 will be described with reference to the components and data in FIGS. 1, 2, 3, 4, 5, 6, 7, and 8. Method 100 will explain the algorithm which processes the digital data stream 88 received by the microprocessor 21.

Method 100 includes an act of collecting the vehicle digital data stream 88 held in the sensor's memory 84 (act 101). For example, approximately once every 50 milliseconds microprocessor 21 requests a download from the memory 84 of the stored detected digital data stream 88. This digital data stream 88 is represented in periodic slices of time (samples) as the sensor 80 detects each approaching vehicle 4. Each data sample includes the Cartesian coordinate position for each detected vehicle 4, the speed of each vehicle 4, and the unique sequential numeric identifier, of each detected vehicle 4 (the vehicle ID). The unique sequential identifier assigned to each vehicle 4 remains with that vehicle 4 during the entire time it is detected by the sensor 80 as it moves about in the detectable pattern of the sensor 80 (even though the vehicle may not always be present within a user defined zone 67a-67h). After this act is completed process is transferred to act 102.

Method 100 also includes the act of resetting the delay timer 56 for each unoccupied zone, resetting the extension timer 57 if a user defined zone is occupied, and if a user defined zone is occupied resetting the vehicle max presence timer 90 (see FIG. 7), which is collectively referred to as act 102. For example, the delay timer 56 is the mechanism which helps to filter out ghost and other anomalies which are not in fact present upon the roadway. To this end in many instances the operator may choose to apply a delay value (in seconds) which must be satisfied after a vehicle 4 is first detected by the sensor 80 before the microprocessor 21 further recognizes the data as a vehicle 4 present upon the roadway.

Said extension timers 57 are established to hold an image (a few pixels in the shape of a dot) of that last detected vehicle 4 within a user defined zone 67a-67h on the gui 50 screen table 63 (see FIG. 7) in the exact location where it was last detected before it exited the user defined zone 67a-67h. Also, so long as an extension timer 57 is in effect for a given user defined zone, a call for a green light is made to the traffic control box 15 for such associated user defined zone. This call is affected by illuminating the assigned opto output 19a-19d for the associated user defined zone 67a-67h. The extension timer 57 is used in instances where an extended brief call for a green light is necessary in order to give detected vehicles 4 exiting a user defined zone 67a-67h time to clear the intersection, such as long left turns or instances where traffic may impede or inhibit a vehicle 4 leaving the user defined zone 67a-67h from clearing the intersection.

Also, a vehicle maximum presence timer ("VMP timer") 90 (see FIG. 7) is activated for each vehicle 4 detected as coming to a stop within a user defined zone 67a-67h. A VMP timer 90 makes a continuous call for a green light while it is activated. Each time a stopped vehicle 4 is detected moving again, the corresponding VMP timer 90 is reset to the operator defined maximum and once again begins its countdown. Of course a call for a green light is made during the duration of the reset VMP timer 90. The purpose of this timer is to minimize the incidents when a vehicle 4 is stranded at an intersection. Since a microwave transceiver sensor 80 cannot detect a motionless object, the VMP timer 90 makes a call to the traffic control box 15 for a green light. Typically the value of the VMP timer 90 is equal to the maximum time between green light cycles. This ensures that the stopped vehicle will not be stranded at the intersection. More explanation is provided at act 111. After this act is completed process is transferred to act 103.

Method 100 also includes the act of is comparing detected vehicle 4 coordinates with user defined zones 67a-67h (decision block 103). For example, user defined zones 67a through 67h are established within the gui 50. If a vehicle 4 is not detected within one of the user defined zones 67a-67h (no at 103) the process transfers to act 114. In decision block 103, if a vehicle 4 is positioned within one of the user defined zones 67a-67h (yes at 103), processing is transferred to act 104.

Method 100 also includes the act of resetting any currently existing OZP timers 91 (act 104). Whenever a OZP timer 91 (see FIG. 7) has been activated for a given user defined zone 67a-67h, in the event the sensor 80 detects another vehicle 4 entering the user defined zone 67a-67h where the OZP timer 91 has been activated, or if the OZP timer 91 simply reaches its maximum time limit, the OZP timer 91 is immediately extinguished (cleared) and a call for a green light to the traffic control box 15 immediately ceases. Upon expiration or clearing of the OZP timer 91, the vehicle 4 identifier is removed from the gui 50 and from the traffic control sensor's memory 84. The functionality of an OZP timer 91 is similar to a VMP timer 90 and is explained in more detail below in act 121. After the process of act 104 is complete, the process is transferred to act 105.

Method 100 also includes the act of determining whether the detected vehicle 4 is actually present upon the roadway in a user defined zone 67a-67h where a delay timer 56 has been established by the operator (decision block 105). If a delay timer 56 has been established (in seconds) by the operator (yes at 105), the process is transferred to act 106.

Method 100 also includes the act of starting a delay timer 56 for each vehicle 4 detected within a user defined zone 67a-67h (act 106). A delay timer 56 is sometimes necessary because the sensor 80 can make false detections which are commonly caused by radar waves being reflected off of stationary objects in or adjacent to the user defined zone 67a-67h being monitored. These false detections are often referred to as ghost images. These ghost images usually last for a brief period and can be largely eliminated if a value (in seconds) is entered into the delay timer 56. As soon as a vehicle 4 is detected moving within a user defined zone 67a-67h, a user defined delay timer 56 is activated for that detected vehicle 4 (act 106). After the process of act 106 is complete, the process is transferred to act 107.

Method 100 also includes the act of comparing the delay timer 56 to zero (act 107). If the delay timer 56 has endured for the maximum period of time as established by the delay timer 56 (yes at 107), the process is transferred to act 108. If the maximum time established for the delay timer 56 has not been satisfied, then opto outputs 19a-19d are not activated (no at 107) and the process is transferred to act 110.

Method 100 also includes the act of activating the corresponding opto output 19a-19d for a user defined zone 67a-67h whenever a delay timer has been identified (act 108). Whenever a vehicle 4 is detected by the sensor within a user defined zone 67a-67h for a period of time which is greater than the time set forth in the delay timer 56, the corresponding opto output 19a-19d is activated for that user defined zone 67a-67h (act 108). Activating the corresponding opto output 19a-19d has the effect of sending a request for a green light to the traffic control box 15 for the associated user defined zone 67a-67h. Such a request for a green light is made individually for each user defined zone 67a-67h (up to four separate channels as discussed elsewhere in this specification). After the process of act 108 is complete, the process is transferred to act 110.

Method 100 also includes the act of activating the opto outputs 19a-19d for a user defined zone 67a-67h (act 109) whenever an object has been detected in such user defined zone and no user defined delay 56 timer has been established for said user defined zone (no at 105). After the process of act 109 is complete, the process is transferred to act 110.

Method 100 also includes the act of determining if a moving vehicle 4 has come to a stop within a user defined zone 67a-67h (act 110). If a stopped vehicle 4 is detected within a user defined zone 67a-67h (yes at 110), a VMP timer 91 is activated for each newly detected stopped vehicle 4 and the process is transferred to act 111. If a vehicle 4 is not detected as stopping within a user defined zone 67a-67h, the algorithm simply loops back to the beginning (act 101) and gathers another sample of information (no at act 110).

Method 100 also includes the act of activating a VMP timer 91 for each detected vehicle 4 which comes to a stop within a user defined zone 67a-67h (act 111). VMP timers are necessary because whenever there are no vehicles 4 detected by the sensor 80 as moving within a user defined zone (67a-67h), there is no request being made by the traffic control sensor system to the traffic control box 15 for a green light for such "empty" zone. Even though there are sometimes no moving vehicles 4 detected within a user defined zone 67a-67h, there are nevertheless sometimes stopped vehicles 4 present within said user defined zone 67a-67h. Since the sensor 80 cannot detect stationary objects such as stationary vehicles 4, it is necessary for the traffic control sensor system to nevertheless request a green light on their behalf. VMP timers 90 accomplish this need by continuing to call for a green light while they are active to ensure that the stationary vehicle 4 receives a green light at the next available traffic light cycle. As soon as each VMP timer 90 expires, the call for a green light ceases and the associated previously detected vehicle 4 is dropped (ignored by the traffic control system). At the expiration of the VMP timer 90, the once stopped vehicle 4 (that has now been dropped) may have cleared the user defined zone 67a-67h or it may still be present as a stationary (undetected and dropped) object within said user defined zone.

In order to understand how the VMP timer operates, the following three scenarios are presented:

1) Assume the traffic lanes being monitored are currently receiving a green traffic light. As vehicle 4 approaches the monitored intersection it eventually enters and exits one or more user defined zones 67a-67h as it moves towards the intersection. Since the traffic light is currently green, during normal traffic flow the vehicle 4 is detected by the sensor 80 as it moves into and out of the various user defined zones (67a-67h). Typically during a green traffic light approaching vehicles do not stop within user defined zones and therefore the VMP timer 90 does not activate for such detected vehicles.

2) Assume the traffic lanes being monitored are receiving a red traffic light. As a result, assume there is at least one vehicle detected by the sensor 80 moving into a user defined zone 67a-67h, but was not detected by the sensor 80 as exiting said user defined zone since the sensor detected the vehicle 4 slowing down and coming to a stop within said user defined zone (as a result of the red traffic light). Since the sensor 80 cannot detect objects that are stationary, this lack of movement within a user defined zone 67a-67h would cause the traffic control sensor system to cease calling for a green light even though a stopped vehicle 4 is indeed present within a user defined zone. Activating the VMP timer 90 has the effect of causing the traffic control sensor system to continue to request a green light from the traffic control box 15 until the user defined time for the VMP timer 90 expires. For example, assume a vehicle 4 enters one of the user defined zones 67a-67h and is stopped therein. Assume that it takes 80 seconds for the traffic light cycle, meaning that it takes 80 seconds from the time when a red light is first presented until the time when a green light is next presented to said monitored lanes. If the aforementioned vehicle 4 is stopped at an intersection by a red light at the exact second the red light is presented, and if the VMP timer is set to 80 seconds (and the traffic light cycle time is also 80 seconds or slightly less), the traffic sensor control system will continue to make a call to the traffic control box 15 for a green light even though the sensor 80 no longer detects the stopped vehicle 4. This ensures that the stopped vehicle 4 receives a green light at the next traffic light cycle.

3) The last scenario involves a vehicle 4 approaching an intersection which is displaying a red traffic light to oncoming traffic. The vehicle is eventually detected by the sensor 80 moving into a user defined zone 67*a*-67*h*, but the sensor 80 does not detect the vehicle 4 coming to a stop within or exiting said user defined zone. This vehicle 4 is said to be occluded because the sensor 80 simply loses track of the vehicle 4 while it is moving within a user defined zone 67*a*-67*h*. Occlusion can occur whenever the view of the sensor 80 becomes temporarily obstructed from the approaching vehicle 4. Reasons for occlusion can include at least the following: 1) tall traffic such as semi tractor trailers, 2) brief sensor 80 malfunction, or 3) ghost radar images which cause the sensor 80 to detect objects that are not actually present which can interfere with an object that is in fact present. After the process of act 111 is complete, the process is transferred to decision block 112.

Method 100 also includes the act of determining if each zone is empty (decision block 112). After the sensor 80 has determined that one or more vehicles 4 have come to a stop within a user defined zone 67*a*-67*h*, there are likely multiple VMP timers 90 in various stages of expiration. So long as at least one VMP timer 90 is active, a request to the traffic control box 15 will be made for a green light. In the event all VMP timers are expired, the traffic control sensor system will consider the user defined zones to be empty and will clear the associated user defined zones (67*a*-67*h*) by turning off the opto outputs 19*a*-19*d* for each affected user defined zone. By turning off the associated opto outputs 19*a*-9*d*, the traffic control box 15 no longer detects a request for a green light from the traffic control sensor system for that particular user defined zone.

After the associated opto output 19*a*-19*d* is turned off it is assumed at this point that all vehicles 4 within the associated user defined zone 67*a*-67*h* have received a green light or have otherwise cleared the affected zone. Of course it is possible that a vehicle 4 is still present within a user defined zone 67*a*-67*h* after all VMP timers 90 have expired, for example when heavy traffic is present or when such vehicle 4 is stalled or becomes disabled. If the user defined zone 67*a*-67*h* is empty, the process is transferred to act 101 (no at act 112). If it is determined that the user defined zone 67*a*-67*h* is not empty (yes at act 112), the process is transferred to decision block 114.

Method 100 also includes the act of determining if a vehicle was present during the last data sample taken from the sensor 80 in a user defined zone 67*a*-67*h* when the most current data sample does not detect any vehicles 4 present within said user defined zone 67*a*-67*h* (decision block 114). This is very important because even though the sensor 80 no longer detects any vehicles 4 within a user defined zone 67*a*-67*h*, there may nevertheless still be a vehicle 4 present within said user defined zone. To this end, the sensor 80 searches its memory 84 to discern if a vehicle 4 was in fact present during the last data sample taken prior to the current data sample which has determined that said user defined zone 67*a*-67*h* is empty. If a vehicle 4 was present in the last data sample (yes at 114) then the process transfers to act 117 to determine if the now undetected (dropped) vehicle 4 was timed out by virtue of an expired VMP timer 90, or if it was occluded. If there was no vehicle 4 present in the user defined zone 67*a*-67*h* during the last sample, the process transfers to decision block 113.

Method 100 also includes the act of determining whether or not the user defined zone 67*a*-67*h* in question has an associated OZP timer 91 (decision block 113). If the user defined zone 67*a*-67*h* in question does not have an OZP timer 91 associated therewith, the process is transferred to act 101. If the user defined zone does have an OZP timer 91 associated therewith, then the process is transferred to decision block 116. If the Method 100 also includes the act of determining if the OZP timer 91 for a given user defined zone 67*a*-67*h* has expired (decision block 116). If the OZP timer 91 has expired (yes at 116), the process transfers to act 115. If the OZP timer 91 has not yet expired (no at 116), the process transfers to act 118.

Method 100 also includes the act of ceasing to request a green light whenever the OZP timer 91 has expired for a user defined zone 67*a*-67*h* (act 115). This is accomplished by ceasing to illuminate the associated opto output 19*a*-19*d* for the user defined zone (67*a*-67*h*). Whenever an opto output is not illuminated there is no request being made to the traffic control box 15 for a green light. After the OZP timer 91 has expired, the process is transferred to act 101.

Method 100 also includes the act of continuing to request a green light so long as the OZP timer 91 remains active (act 118). So long as the associated opto output 19*a*-19*d* is illuminated (for any reason whatsoever) the traffic control box 15 interprets said illumination as a request for a green light for the user defined zone(s) 67*a*-67*h* that are associated with said opto output 19*a*-19*d*. After the process of act 118 is complete, the process is transferred to act 101.

Method 100 also includes the act of determining if a detected vehicle was occluded or if it was dropped by virtue of its VMP timer 90 expiring (act 117). As explained above in act 111, a vehicle 4 is dropped (ignored) by the traffic control sensor system if its MVP timer 90 expires, even though the dropped vehicle 4 may still be present within the user defined zone 67*a*-67*h*.

On the other hand, occlusion is the condition which occurs when an approaching vehicle 4 becomes undetected by the sensor 80 (even if momentarily) during its travel through a user defined zone 67*a*-67*h*. When a vehicle 4 is occluded the sensor 80 never regains detection of the vehicle 4 during its travel within the user defined zone 67*a*-67*h* because the vehicle: 1) exited the user defined zone before contact with the sensor 80 was re-established, or 2) the vehicle 4 has come to a stop within the user defined zone before contact with the sensor 80 is re-established, thereby as a stationary object being impossible to be detected by the sensor 80. If the detected vehicle is not dropped or occluded (no at 117) during its travel within the user defined zone 67*a*-67*h*, the process of the algorithm is transferred to act 119. If the detected vehicle is dropped or occluded (yes at 117) during its travel within the user defined zone 67*a*-67*h*, the process of the algorithm is transferred to act 121.

Method 100 also includes the act of determining whether or not the user defined zone 67*a*-67*h* in question has an associated extension timer 57 (act 119). Extension timers 57 are fully discussed above in act 102. If the user defined zone 67*a*-67*h* in question does not have an extension timer 57 associated therewith, the process is transferred to act 101. If the user defined zone does have an extension timer 57 associated therewith, then the process is transferred to act 120.

Method 100 also includes the act of activating an OZP timer 91 for any user defined zone 67*a*-67*h* that has a dropped or occluded vehicle 4 (act 121). The OZP timer 91 is a timer that acts very similar to a VMP timer 90 in that its duration, in seconds, is established by the end user. During its activation the OZP timer 91 activates the opto output 19*a*-19*d* associated with that user defined zone 67*a*-67*h*. This of course has the effect of making a request to the traffic control box 15 for a green light even though a vehicle 4 is not currently being detected by the sensor 80 within the applicable user defined zones 67a-67h. Also similar to a VMP timer 90, the duration of the OZP timer 91 is usually established for a duration of time (in seconds) which satisfies a full traffic light cycle (from the beginning of a red light to the beginning of a subsequent green light for a user defined zone). Activating the OZP timer 91 gives any stranded vehicle 4 within a user defined zone 67a-67h additional time to clear the user defined zone. The OZP timer 91 is different from the VMP timer 90 in that it only activates if there are no other vehicles 4 currently being detected within the user defined zone 67a-67h in question. This creates a more efficient mechanism for maximizing traffic flow through a monitored intersection. This maximization is accomplished by not duplicating a call for a green light (via the OZP timer 91) to the traffic control box 15 for the entire time set forth by the end user in the gui 50, usually the duration of one entire traffic light cycle. It is assumed that a dropped or occluded vehicle 4 will have enough time to vacate the user defined zone 67a-67h in question given the time allowed by the VMP timer 90 (usually one whole traffic light cycle) and subsequently during the time a green light is being requested as a result of other vehicles 4 being detected within the user defined zone 67a-67h.

Upon activation of the OZP timer 91, the last known X-Y coordinate location of the dropped or occluded vehicle 4 is displayed upon the gui 50 in the corresponding X-Y coordinate position. After the process of act 121 is complete, the process is transferred to act 101.

Method 100 also includes the act of activating an extension timer 57 whenever the last detected vehicle 4 exits the user defined zone 67a-67h (act 120). The duration (in seconds) of the extension timer 57 for each user defined zone 67a-67h is customizable by the end user. Usually the extension timer's 57 duration is set for a brief time as anticipated by the end user to enable traffic stopped at the intersection in a user defined zones 67a-67h to fully cross or exit from the intersection. Activating the extension timer 57 causes illumination of the opto output 19a-19d for the associated user defined zone 67a-67. Illuminating the opto output 19a-19d has the effect of requesting a green light from the traffic control box 15. After the extension timer is activated, the process is transferred to decision block 123.

Method 100 also includes the act of determining if the extension timer 57 or a given user defined zone 67a-67h has expired (decision block 123). If the extension timer 57 has expired (yes at 123), the process transfers to act 122. If the extension timer 57 has not yet expired (no at 123), the process transfers to act 124.

Method 100 also includes the act of ceasing to request a green light whenever the extension timer has expired for a user defined zone 67a-67h (act 122). This is accomplished by ceasing to illuminate the associated opto output 19a-19d for the user defined zone (67a-67h). Whenever an opto output is not illuminated there is no request being made to the traffic control box 15 for a green light. After the extension timer 57 has expired, the process is transferred to act 101.

Method 100 also includes the act of continuing to request a green light so long as the extension timer remains active (act 124). So long as the associated opto output 19a-19d is illuminated (for any reason whatsoever) the traffic control box 15 interprets said illumination as a request for a green light for the user defined zone(s) 67a-67h that are associated with said opto output 19a-19d. After the process of act 122 is complete, the process is transferred to act 101.

While the invention has been illustrated and described in detail in the drawings and foregoing description, the same is to be considered as illustrative and not restrictive in character, it being understood that only a preferred embodiment has been shown and described and that all changes and modifications that come within the spirit of the invention are desired to be protected.

We claim:

1. A computerized system that includes at least one sensor for detecting targets upon a roadway surface, a method for creating a system configuration, the method comprising:
    an act of acquiring sensor data from at least one transducer view of a roadway surface which carries moveable objects;
    an act of detecting at least one of said movable objects within the one or more transducer views of the roadway surface;
    an act of establishing one or more virtual user defined zone upon the roadway surface within a detection area of said one or more transducers;
    an act of creating parameters which process data from the at least one transducer;
    an act of transmitting one or more green light requests after said processing to a traffic control system based upon the position of said at least one movable object in relation to said one or more virtual user defined zone; wherein the act of creating parameters which process data from at least one transducer comprises the act of establishing an occlusion zone protection timer which is activated upon the last detected stopped movable object being present within the one or more virtual user defined zone after said stopped movable object has been occluded.

2. A method as recited in claim 1, wherein the act of establishing an occlusion zone protection timer which is activated comprises the act of sending a request to said traffic system for a signal change to a green light.

3. A computer program product for use at a computerized system that includes at least one sensor for sensing objects in a roadway section which includes an intersection, the computer program product for implementing a method for creating a system configuration, the computer program product comprising one or more computer-readable executable media having stored thereon computer-executable instructions that, when executed by one or more processors of the computerized system, cause the computerized system to perform the following:
    acquire sensor data from one or more transducer views of the roadway;
    detect at least one target within the one or more transducer views based on the acquired sensor data;
    configure one or more user defined zones by inputting numeric data into one or more graphical user interface integral with said computer program product;
    process said acquired sensor data in a manner which identifies said at least one detected target which travels into said one or more user defined zone;
    process said acquired sensor data in a manner which identifies said at least one detected target that has become motionless within said one or more user defined zone;
    activate a vehicle maximum presence for said at least one detected target after said computerized system has determined that said at least one detected target is motionless within one or more said user defined zone; and
    continue to send a request to said traffic system during said maximum presence timer predefined duration for said signal change to a said green light regardless of whether another component of said computerized system is also requesting said green light.

4. The computer program product as recited in claim 3, further comprising computer-executable instructions that, when executed by a processor, cause the computerized system to perform the following:

activate an occlusion zone protection timer for said at least one detected target after said computerized system has determined that the duration of the maximum presence timer has expired, and at least one detected target is motionless within the boundaries of said one or more user defined zone;

send a request to said traffic system during said occlusion zone protection timer predefined duration for said signal change to a said green light regardless of whether another component of said computerized system is also requesting said green light.

5. The computer program product as recited in claim 3, further comprising computer-executable instructions that, when executed by a processor, cause the computerized system to perform the following:

activate an occlusion one protection timer for said at least one detected target after said computerized system has determined that it has lost contact with said at least one detected target during its motion within said one or more user defined zone;

send a request to said traffic system during said occlusion zone protection timer predefined duration for said signal change to a said green light regardless of whether another component of said computerized system is also requesting said green light.

6. The computer program product as recited in claim 3, further comprising computer-executable instructions that, when executed by a processor, cause the computerized system to perform the following:

activate an extension timer when at least one detected target exits said one or more user defined zone, send a request to said traffic system during said extension timer predefined duration for said signal change to said green light regardless of whether another component of said computerized system is also requesting said green light.

\* \* \* \* \*